(12) United States Patent
Nishikawa et al.

(10) Patent No.: US 7,304,764 B2
(45) Date of Patent: Dec. 4, 2007

(54) INFORMATION PROCESSING APPARATUS, PRINTING CONTROL METHOD, AND STORAGE MEDIUM PRODUCT

(75) Inventors: Satoshi Nishikawa, Kanagawa (JP); Koji Nakagiri, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 894 days.

(21) Appl. No.: 09/994,723

(22) Filed: Nov. 28, 2001

(65) Prior Publication Data

US 2002/0067508 A1 Jun. 6, 2002

(30) Foreign Application Priority Data

Dec. 6, 2000 (JP) ............................. 2000-371544

(51) Int. Cl.
*G06F 15/00* (2006.01)
*G06K 1/00* (2006.01)
*G06K 15/00* (2006.01)

(52) U.S. Cl. .................. 358/1.18; 358/1.12; 358/1.15; 358/1.16; 358/1.17

(58) Field of Classification Search ............... 358/1.12, 358/1.15, 1.16, 1.17, 1.18
See application file for complete search history.

(56) References Cited

U.S. PATENT DOCUMENTS

| | | | |
|---|---|---|---|
| 5,495,561 A | * | 2/1996 | Holt ............................ 358/1.15 |
| 6,120,197 A | | 9/2000 | Kawamoto et al. ............ 400/61 |
| 6,188,490 B1 | * | 2/2001 | Miyake ....................... 358/1.18 |

* cited by examiner

*Primary Examiner*—Twyler Lamb
*Assistant Examiner*—Yixing Qin
(74) *Attorney, Agent, or Firm*—Fitzpatrick, Cella, Harper & Scinto

(57) ABSTRACT

An N-page printing function set on the basis of a physical sheet is provided by a printing control program installed in an information processing apparatus. In the information processing apparatus when designating of N-page printing, in which drawing data of N pages (N>1, N is an integer) is to be printed on one print sheet, the drawing data of each page is arranged in each of equal N-divided areas of a physical sheet by scaling-down. Print data is produced based on the arranged drawing data.

22 Claims, 19 Drawing Sheets

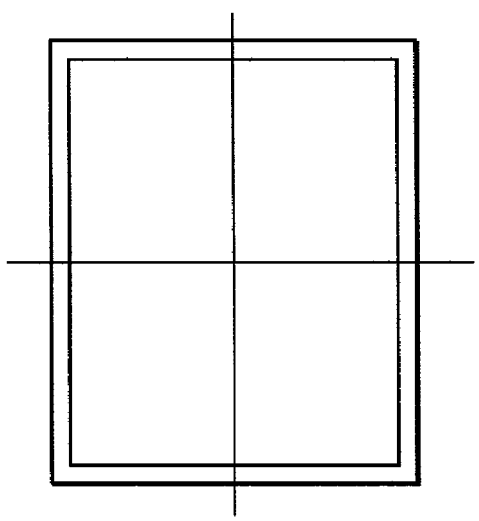
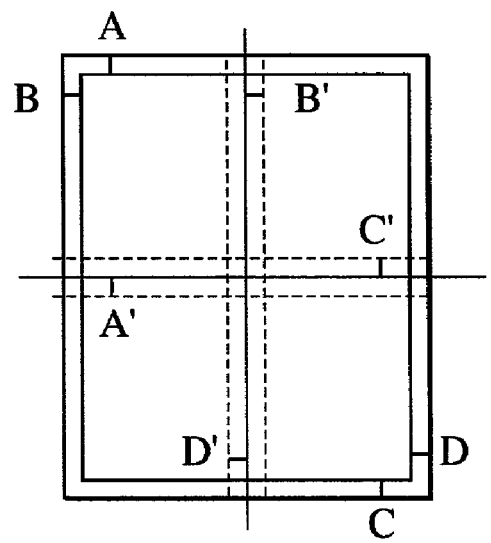
FIG. 21A         FIG. 21B
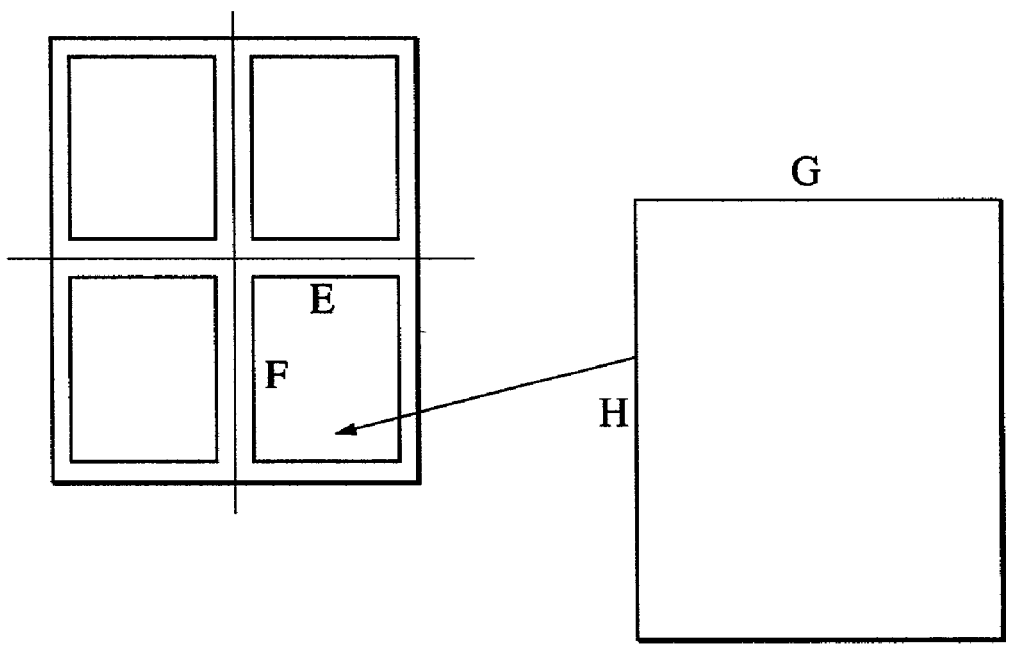
FIG. 21C

00000001 ··· APPLIED TO 2-PAGE PRINTING
00000010 ··· APPLIED TO 4-PAGE PRINTING
00000100 ··· APPLIED TO 6-PAGE PRINTING
00001000 ··· APPLIED TO 8-PAGE PRINTING
00010000 ··· APPLIED TO 16-PAGE PRINTING

INFORMATION PROCESSING APPARATUS, PRINTING CONTROL METHOD, AND STORAGE MEDIUM PRODUCT

BACKGROUND OF THE INVENTION

1. Field of the Invention

The present invention relates to an information processing apparatus, a printing control method, and a storage medium product in which a printing control program is stored. More particularly, the present invention relates to a printing control method for a printing control program used in an information processing apparatus, such as a personal computer, for producing print data to be printed by a printing device, such as a printer.

2. Description of the Related Art

Hitherto, a printing device, such as a printer, has been proposed which is capable of printing print data of multiple pages, received from a host computer, in match with one sheet of output paper through scaled-down layout of the pages, i.e., which has the N-page printing function (function of printing data of N pages on one sheet of paper). To realize that function in a printing device, however, print data of N pages must be analyzed to prepare data in the form of intermediate data easily adapted for printing. Although 2- or 4-page printing is feasible, 8- or 16-page printing requires a very large amount of buffer memories in the printing device and has a difficulty in practical realization because of high cost.

In some of recent printing systems, therefore, the system includes processing to provide an equivalent effect of the N-page printing function on the side of a printer driver that is printer control software installed in a host computer. More specifically, drawing commands input from an application are spooled in such a system. When drawing commands for designated N pages are spooled, the drawing commands for N pages are scaled down and the coordinates of each page are calculated for conversion to new drawing commands. In accordance with the new drawing commands, print data in the printer language is produced.

That N-page printing function in a printer driver is executed by dividing a printable region, which is obtained by subtracting a print margin from a sheet size, into equal N areas, scaling-down the drawing commands for logical pages so as to fall within the respective equal N-divided print areas of the logical pages, and then calculating the coordinates of each page. Through the above processing, the logical pages are arranged in the printable region, and a problem of missing in print of the drawing contents is avoided. Also, while each page of the drawing contents is slightly scaled down in comparison with that obtained by the N-page printing function provided on the printer side, an aesthetically improved printing result is achieved because pages are arranged offset toward the center.

With the conventional N-page printing function on the printer driver side, however, N logical pages are arranged on the basis of the printable region. This feature has led to a disadvantage that when a printed sheet is cut into pieces of 1/N size, the output page layout deviates from that resulting from printing the same N logical pages directly on individual cut sheets of 1/N size. Stated otherwise, when the conventional N-page printing function on the printer driver side is applied to print data on a 4-zone post card (sheet including four normal post cards which are arranged in a two-row, two-column array and which can be used as normal post cards by cutting the sheet into four pieces after printing) issued from the Ministry of Posts and Telecommunications in Japan, the print position may deviate depending on the arrangement of four post card areas. For example, contents of four post cards are printed offset toward the center of the original sheet such that an upper left post card is offset downward to the right, an upper right post card is offset downward to the left, a lower left post card is offset upward to the right, and a lower right post card is offset upward to the left. Therefore, a zip code, for example, is printed in misalignment with the designated boxes, and an unsatisfactory printing result occurs.

However, it has not hitherto been proposed to cope with that problem by providing, on the printer driver side, the N-page printing function of arranging logical pages in equal N-divided areas on the basis of a physical sheet.

Also, in recent printer drivers, the N-page printing function is provided as a module common to all printer drivers. This means that whether the N-page printing function is on the basis of a physical sheet or a printable region must be set common to all printer drivers.

SUMMARY OF THE INVENTION

Accordingly, it is an object of the present invention to provide the N-page printing function on the basis of a physical sheet as the function of an information processing apparatus and the function of a printing control program installed in an information processing apparatus.

Another object of the present invention is to employ the N-page printing function on the basis of a physical sheet and the N-page printing function on the basis of equal N-divided areas of a printable region in combination, and to provide the function of selectively changing over both the printing functions as required.

To achieve the above objects, according to the present invention, there is provided an information processing apparatus for producing print data to be printed by a printing device, the apparatus comprising an entry unit for entering designation of N-page printing in which drawing data of N pages (N>1, N is an integer) is printed on one print sheet; an arranging unit for, when the designation of N-page printing is entered through the entry unit, arranging the drawing data of each page in each of equal N-divided areas of a physical sheet through scaling-down; and a print-data producing unit for producing print data based on the drawing data arranged by the arranging unit.

Also, according to the present invention, there is provided an information processing apparatus comprising an entry unit for entering designation of N-page printing in which drawing data of N pages (N>1, N is an integer) is printed on one print sheet; a physical N-page printing arranging unit for arranging the drawing data of each page at the center of each of equal N-divided areas of a physical sheet through scaling-down; a printable region N-page printing arranging unit for arranging the drawing data of each page in each of equal N-divided areas of a printable region on a physical sheet through scaling-down; and a determining unit for determining which one of the physical N-page printing arranging unit and the printable region N-page printing arranging unit is employed to execute processing for arranging the pages, when the designation of N-page printing is entered through the entry unit.

Other features of the present invention are achieved with a printing control method for implementing the processing set forth above, and a storage medium product in which a printing control program is stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 21A-21C are representations for explaining the embodiment of the present invention.

FIGS. 22A-22C are representations for explaining the embodiment of the present invention.

DESCRIPTION OF THE PREFERRED EMBODIMENTS

First Embodiment

A preferred embodiment of the present invention will be described below.

Figure 1:
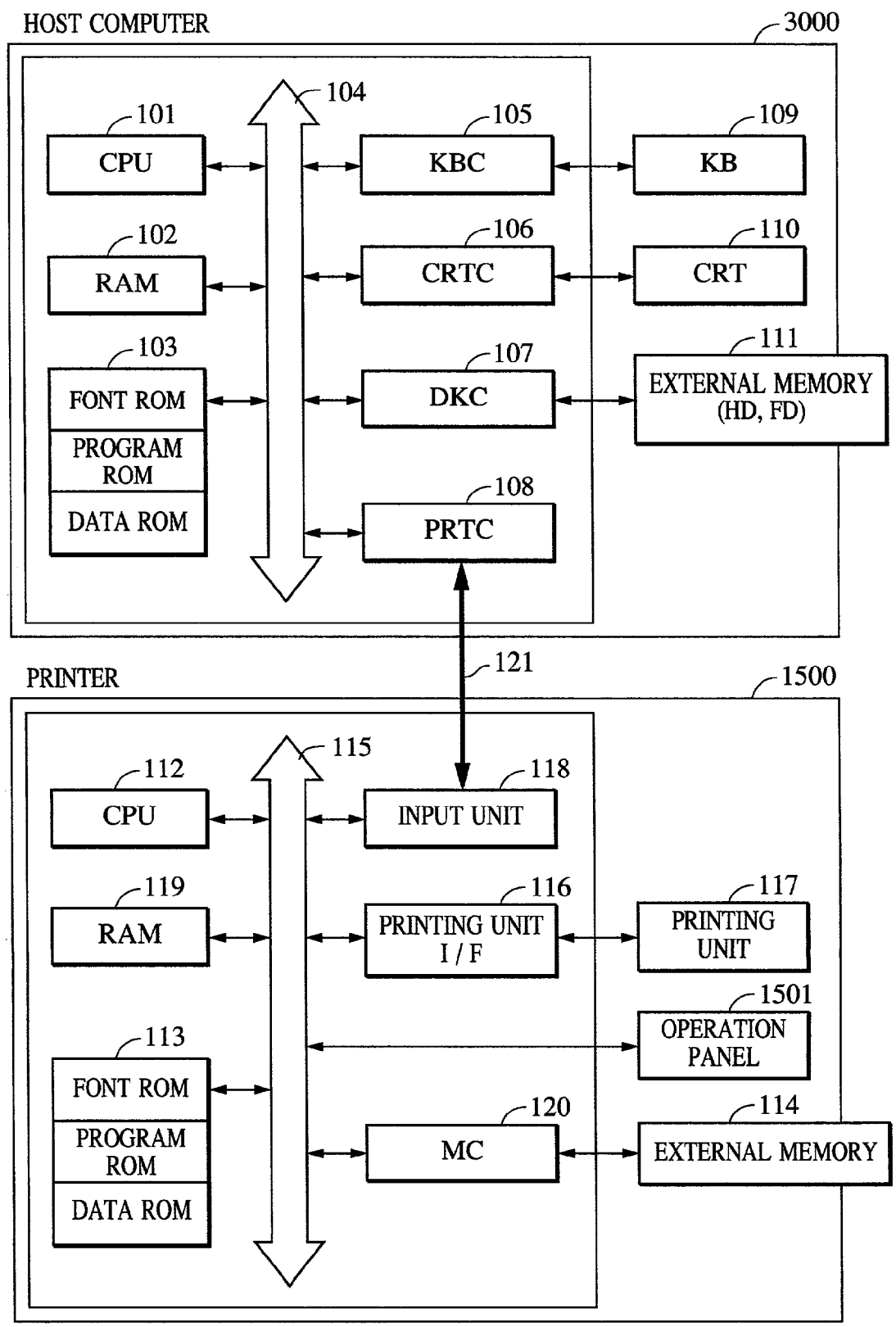
FIG. 1 is a block diagram of one embodiment of the present invention for explaining a configuration of a printing control system.

FIG. 1 is a block diagram of one embodiment of the present invention for explaining a configuration of a printing control system. Note that so long as the functions of the present invention are implemented, the present invention can be embodied in any form of a single piece of equipment, a system comprising plural pieces of equipment, and a system that executes processing through connection via a network such as a LAN or WAN.

In FIG. 1, a host computer 3000 suitable as an information processing apparatus of the present invention includes a CPU 101 for executing processing of documents, which contain figures, images, characters and tables (including spreadsheets) in mixed combinations, in accordance with a document processing program, etc., stored in a program ROM as a part of a ROM 103 or in an external memory 111. The CPU 101 controls various devices connected to a system bus 104 in a supervising manner. Also, the program ROM as a part of the ROM 103 or the external memory 111 stores an operating system program (OS) serving as a control program for the CPU 101, etc. A font ROM as a part of the ROM 103 or the external memory 111 stores font data for use in the document processing, etc. A data ROM as a part of the ROM 103 or the external memory 111 stores various data for use in the document processing, etc. A RAM 102 serves as, e.g., a main memory and a work memory for the CPU 101.

A keyboard controller (KBC) 105 controls a key input from a keyboard 109 or a pointing device (not shown). A CRT controller (CRTC) 106 controls display on a CRT display (CRT) 110. Numeral 107 denotes a disk controller (DKC) for controlling access to the external memory 111, such as a hard disk (HD) and a floppy disk (FD), which stores a boot program, various applications, font data, user files, editing files, a printing control program (referred to also as a "printer driver" hereinafter) which is a feature of the present invention, and so on. A printer controller (PRTC) 108 is connected to a printer 1500 via a two-way interface (I/F) 121 and executes communication control processing between the host computer 3000 and the printer 1500.

The CPU 101 executes, e.g., development processing (rasterizing) of outline font into a display information RAM, which is set in the RAM 102, so that WYSIWYG results are obtained from an image on the CRT 110. Also, the CPU 101 opens any of various registered windows in accordance with a command instructed by, e.g., a mouse cursor (not shown) on the CRT 110, and executes various kinds of data processing. When making printing, users open a window related to setting of printing, and performs setting of a printer and setting of a print processing method for the printer driver (particulars to be set are called "print settings" herein), including selection of the printing mode.

The printer 1500 is controlled by a CPU 112. The printer CPU 112 outputs an image signal as output information to a printing unit (printer engine) 117, which is connected to a system bus 115, in accordance with a control program, etc. stored in a program ROM as a part of a ROM 113 or a control program, etc. stored in an external memory 114. Also, the program ROM as a part of the ROM 113 stores a control program for the CPU 112, etc. A font ROM as a part of the ROM 113 stores font data for use in producing the output information, etc. A data ROM as a part of the ROM 113 stores, e.g., information utilized by the host computer when the printer is not provided with the external memory 114 such as a hard disk.

The CPU 112 is capable of communicating with the host computer 3000 via an input unit 118 so that information, etc. in the printer can be notified to the host computer. A RAM 119 serves as, e.g., a main memory and a work memory for the CPU 112, and is constructed to be able to expand a memory capacity with an option RAM connected an add-on port (not shown). Further, the RAM 119 is also employed as an output information development area, an environment data storage area, an NVRAM, and so on. Access to the external memory 114, such as a hard disk (HD) and an IC card, is controlled by a memory controller (MC) 120. The external memory 114 is connected as an option unit and stores font data, an emulation program, form data, etc.

The external memory 114 is not limited to a single unit, but may be provided in plural number. To be adapted for fonts other than an internally stored font, the printer may be constructed so as to allow connection with a plurality of external units, such as a font option card and an external memory in which a program for interpreting printer control languages, belonging to different language systems, is stored. Further, the printer may include a NVRAM (not shown) to store printer mode setting information from an operation panel 1501. The operation panel 1501 includes operation switches, LED indicators, etc. arranged thereon.

Figure 2:
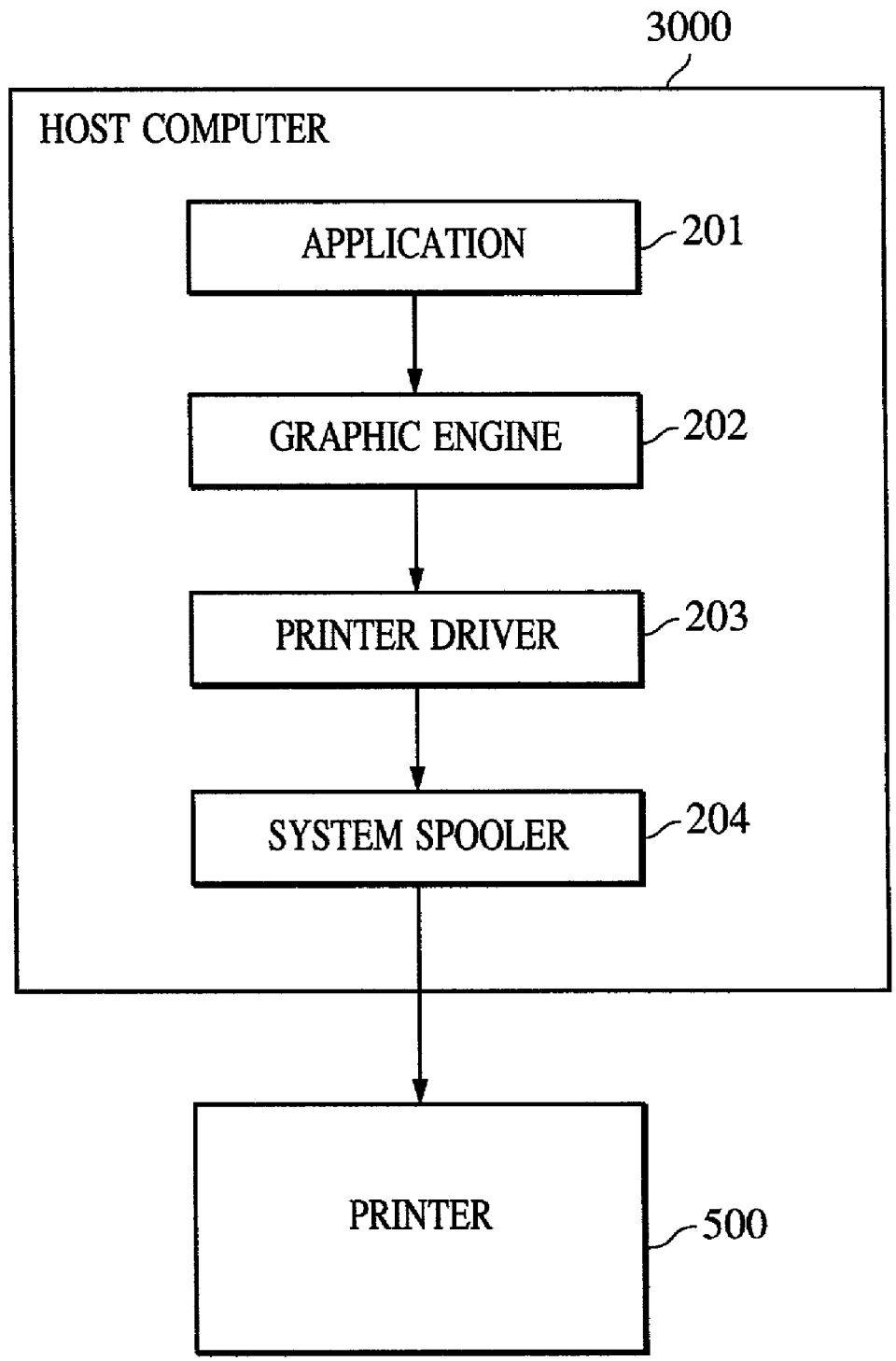
FIG. 2 is a block diagram showing a configuration of a typical printing system in a host computer to which a printer is connected.

FIG. 2 is a block diagram showing a configuration of a typical printing system in the host computer to which a printing device, such as a printer, is connected directly or via a network. An application 201, a graphic engine 202, a printer driver 203, and a system spooler 204 are program modules which exist in the form of files stored in the external memory 111, and which are each loaded into the RAM 102 by the OS or another module utilizing the loaded program module when it is executed. Also, the application 201 and the printer driver 203 can be added to a hard disk (HD) as one example of the external memory 111 from a FD or CD-ROM as another example of the external memory 111 or via a network (not shown). The application 201 stored in the external memory 111 is loaded into the RAM 102 and then executed. When printing is made on the printer 1500 from the application 201, outputting (drawing) of print data is performed using the graphic engine 202 that serves as a drawing means by the OS and is also executable after being loaded into the RAM 102.

The graphic engine 202 similarly loads the printer driver 203, which is prepared for each printing device, into the RAM 102 from the external memory 111, and sets an output of the application 201 in the printer driver 203. Then, based on a GDI (Graphic Device Interface) function that is a first-type drawing function received from the application 201, the graphic engine 202 converts the GDI function to a DDI (Device Driver Interface) function that is a second-type drawing function interpretable by the printer driver 203 (exactly speaking, it is interpreted by the graphic engine as a part of the OS while looking at the description in a library of the printer driver), and then outputs the DDI function to the printer driver 203. Based on the DDI function received from the graphic engine 202, the printer driver 203 creates print data described using control commands, e.g., PDL (Page Description Language), which are recognizable by a printing device. The print data thus created using printer control commands is output via the interface 121 to the printer 1500, as print data, through the system spooler 204 that has been loaded in the RAM 102 by the OS.

Figure 3:
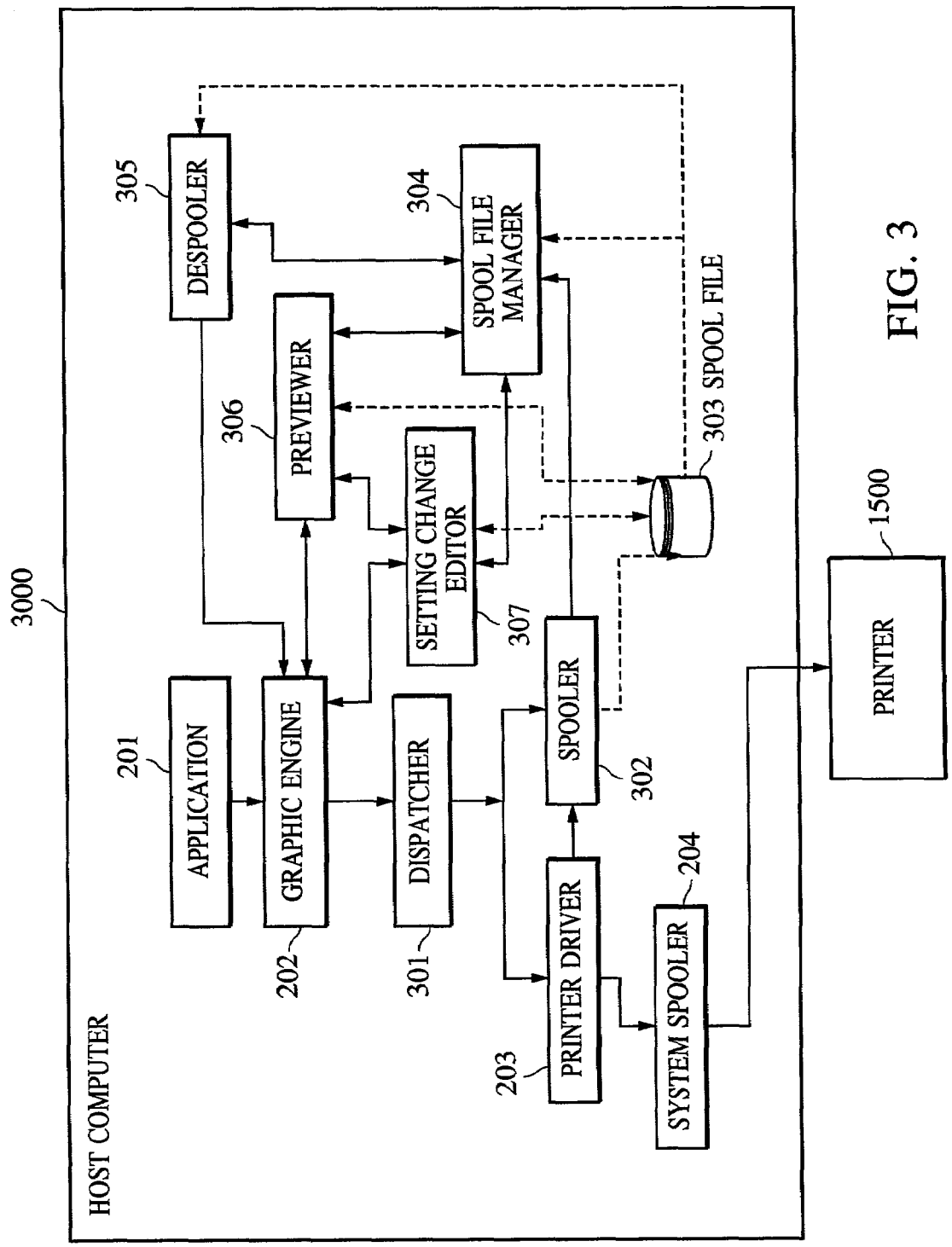
FIG. 3 is a block diagram showing a configuration of the printing system for spooling a print command from an application into the form of intermediate code before conversion to a printer control command.

In addition to the system comprising the printer and the host computer shown in FIG. 2, the printing system of this embodiment is constructed to have the function of spooling print commands from the application in the form of intermediate code data, as shown in FIG. 3.

The printing system shown in FIG. 3 is an expanded version of that shown in FIG. 2. In the printing system of FIG. 3, when print commands (DDI functions as second-type drawing functions) are transmitted from the graphic engine 202 to the printer driver 203, a spool file 303 in the form of intermediate code is created before transmission to the printer driver 203. More specifically, in the system of FIG. 2, the application 201 is released from the print processing at the time when the printer driver 203 has completely converted all of print commands from the graphic engine 202 to printer control commands. On the other hand, in the system of FIG. 3, the application 201 is released from the print processing at the time when a spooler 302 has completely converted all of print commands to intermediate code data and has outputted it to a spool file 303. Usually, a period of time until return to the application is shorter in the system of FIG. 3. Also, in the system of FIG. 3, the contents of the spool file 303 can be processed. Therefore, the system of FIG. 3 is able to realize the functions, which are not provided by the application, such as scaling up or down a page and scaling down plural pages and then printing them on one page for print commands (GDI functions as first-type drawing functions).

To that end, as compared with the system of FIG. 2, the system of FIG. 3 is expanded so as to spool print commands from the application in the form of intermediate code data. Usually, setting for processing the print commands is made through a window provided by the printer driver 203, and the printer driver 203 holds the contents of the setting in the RAM 102 or the external memory 111.

The system of FIG. 3 will be described in more detail below. In this expanded system, as shown, a dispatcher 301 receives DDI functions as print commands from the graphic engine 202. When the print commands (DDI functions) received by the dispatcher 301 from the graphic engine 202 are based on print commands (GDI functions) issued from the application 201 to the graphic engine 202, the dispatcher 301 loads the spooler 302 stored in the external memory 111 into the RAM 102 and delivers the print commands (DDI functions) to the spooler 302 instead of the printer driver 203.

The spooler 302 analyzes the received print commands, converts them into an intermediate code in units of a page, and outputs the converted intermediate code to the spool file 303. This spool file stored in units of a page in the form of intermediate code is called a PDF (Page Description File). Also, the spooler 302 acquires, from the printer driver 203, processing settings (such as settings of N-up, both-side, stapling, and color/monochromatic mode, referred to as "print settings" hereinafter) related to print processing that is set for the printer driver 203, and then hold them in the spool file 303 as a file in units of a job. Such a setting file stored in units of a job is called a job setting file or SDF (Spool Description File). The job setting file will be described later. While the spool file 303 is created as a file in the external memory 111 in the embodiment, it may be created in the RAM 102. In addition, the spooler 302 loads a spool file manager 304, which is stored in the external memory 111, into the RAM 102 and then notifies the status in creation of the spool file 303 to the spool file manager 304. Subsequently, the spool file manager 304 determines whether the printing can be made in accordance with the contents of the processing settings related to the print processing, which have been held in the spool file 303.

When the spool file manager 304 determines that the printing can be made using the graphic engine 202, it loads a despooler 305, which is stored in the external memory 111, into the RAM 102 and then instructs the despooler 305 to perform the print processing of the page description file in the form of intermediate code held in the spool file 303.

The despooler 305 processes the page description file in the form of intermediate code held in the spool file 303 in accordance with the job setting file that contains the processing settings, and produces GDI functions again. Then, the despooler 305 outputs the produced GDI functions via the graphic engine 202 again.

When the print commands (DDI functions) received by the dispatcher 301 from the graphic engine 202 is based on print commands (GDI functions) issued from the despooler 305 to the graphic engine 202, the dispatcher 301 sends the received print commands to the printer driver 203 instead of the spooler 302.

Based on the DDI functions received from the graphic engine 202, the printer driver 203 creates printer control commands using the page description language, for example, and outputs the commands to the printer 1500 via the system spooler 204.

In addition to the expanded system described above, the system of FIG. 3 further includes a previewer 306 and a setting change editor 307 so as to provide the functions of displaying a print preview, changing the print settings, and joining a plurality of jobs.

Figure 9:
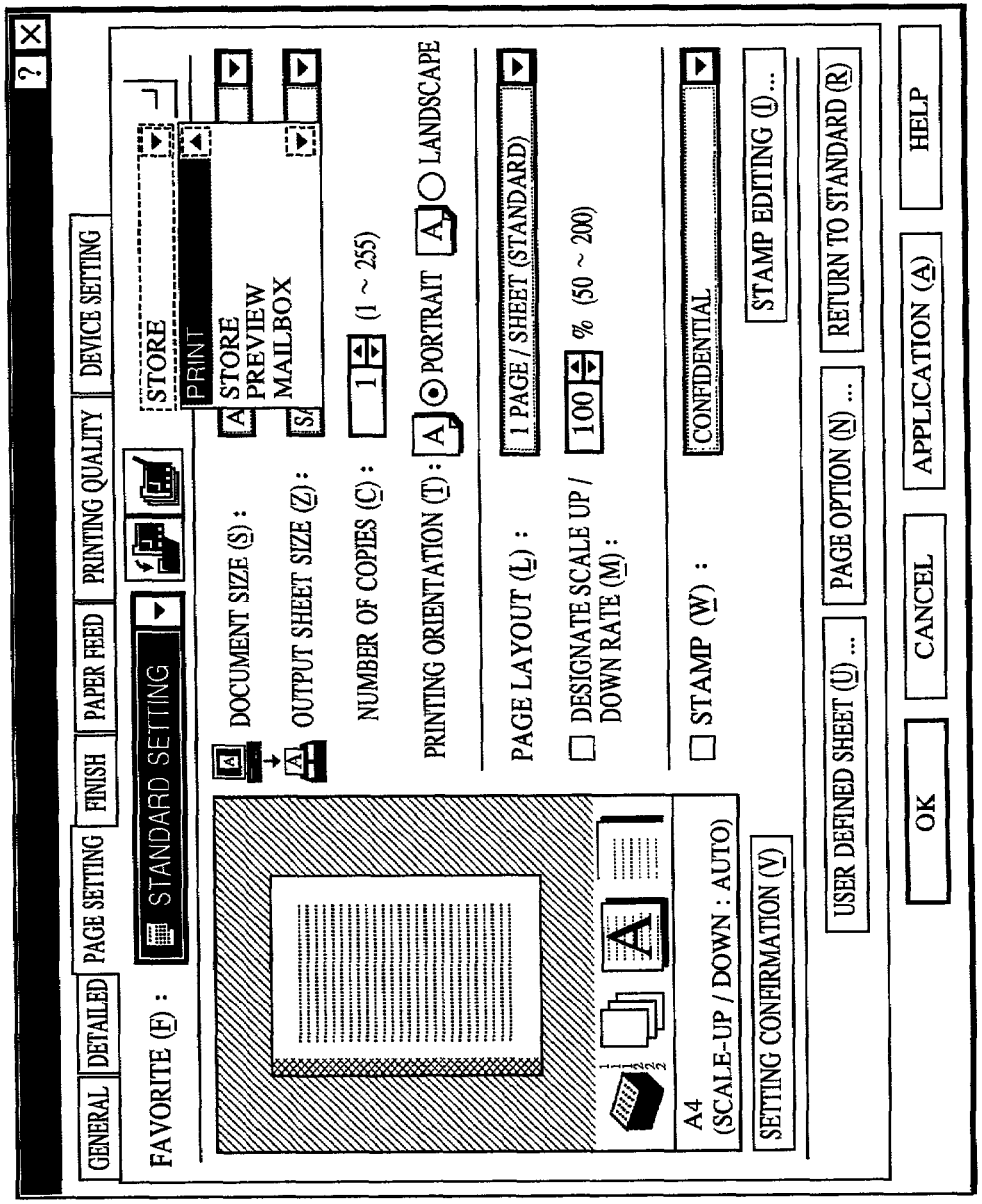
FIG. 9 shows one example of a print spool setting screen.

To display a print preview, change the print settings or join a plurality of jobs, users are required to designate, in a property screen of the printer driver shown in FIG. 9, "store" in a pull-down menu used for "designation of an output target". When users want to look at only a print preview, they may select "preview" as the designation of an output target.

Figure 16:
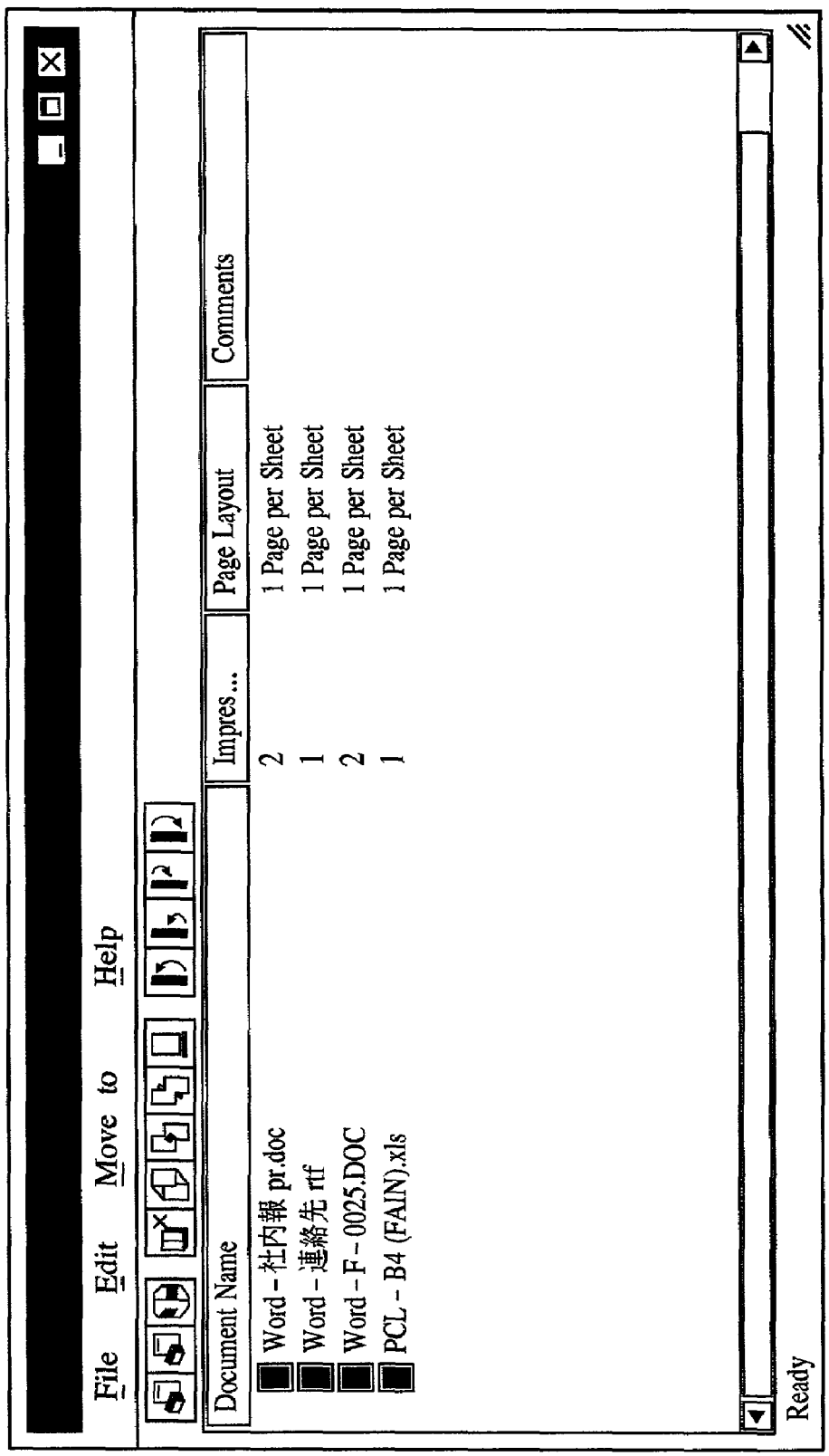
FIG. 16 shows one example of a screen displaying a list of print jobs spooled in the spool file manager.

Thus, the particulars set in the property of the printer driver are stored as a setting file in a structure (called DEVMODE in the Windows OS) provided by the OS. Such a structure contains, e.g., a setting item as to whether the processing settings held in the spool file 303 contain the setting to instruct the spool file manager 304 to store the page description file and the job setting file. The spool file manager 304 reads the processing settings through the printer driver. When "store" is designated, both the page description file and the job setting file are created and stored in the spool file 303 as described above, and a window screen of the spool file manager 304 is popped up as shown in FIG. 16. The jobs spooled in the spool file 303 are listed on the window screen. FIG. 16 shows one example in which four jobs are spooled. By depressing any item in a menu bar or any of menu icons lying under the menu bar, job operations can be started. The number of operations selectable on the menu bar is the same as those selectable using the menu icons.

Eleven kinds of job operations are executable in the state of the job being selected; i.e., "print", "print after saving" in which printing is made while keeping the spool file in the form of intermediate code as is, "preview" for looking an output preview of the job in consideration of the print settings, "delete" for deleting the spool file in the form of intermediate code, "copy" for producing a copy of the spool file in the form of intermediate code, "join" for joining a plurality of jobs, provided as separate spool files in the form of intermediate code, into one job, "divide" for dividing a joined job into a plurality of original jobs, "job edit" for changing print settings (such as layout setting and finishing setting) of a single or joined job, "move to top" for setting the print order of a designated job to the first, "move to one-up line" for advancing one the print order of a designated job, "move to one-down line" for setting back one the print order of a designated job, and "move to last" for moving the print order of a designated job to the last.

When a preview of a certain single or joined job is designated on the window screen of the spool file manager 304 (FIG. 16), the spool file manager loads the previewer 306, which is stored in the external memory 111, into the RAM 102 and then instructs the previewer 306 to perform preview processing of the job in the form of intermediate code held in the spool file 303.

The previewer 306 reads successively each of page description files (PDF) in the form of intermediate code held in the spool file 303, and processes the read file in accordance with the particulars of the processing settings contained in the job setting file (SDF), which is also held in the spool file 303, thereby outputting GDI functions to the graphic engine 202. Then, the graphic engine 202 outputs drawing data in its own client area, whereupon a print preview is output on the screen.

The graphic engine 202 is able to perform proper rendering depending on a designated output target. The previewer 306 can therefore realize the preview processing, as with the despooler 305, by processing the intermediate code contained in the spool file 303 in accordance with the particulars of the processing settings, which are also contained in the spool file 303, and then outputting the processed data by utilizing the graphic engine 202. By thus storing the processing settings set by the printer driver, as a job setting file, in the spool file 303 and processing and outputting data of the page description file in accordance with the job setting file, a print preview close to data output to the printer can be presented to users depending on how the actual drawing data is printed, whether N-up printing (in which N logical pages are printed on one physical page through scale-down layout) is designated, whether both-side printing is designated, whether binding is designated, and whether stamping is designated. The preview function provided by conventional application software for document creation, etc., draws a preview based just on the page setting specific to the application, and does not reflect the print settings set by the printer driver. Accordingly, it has previously been impossible for users to recognize an output preview that is actually printed.

Figure 17:
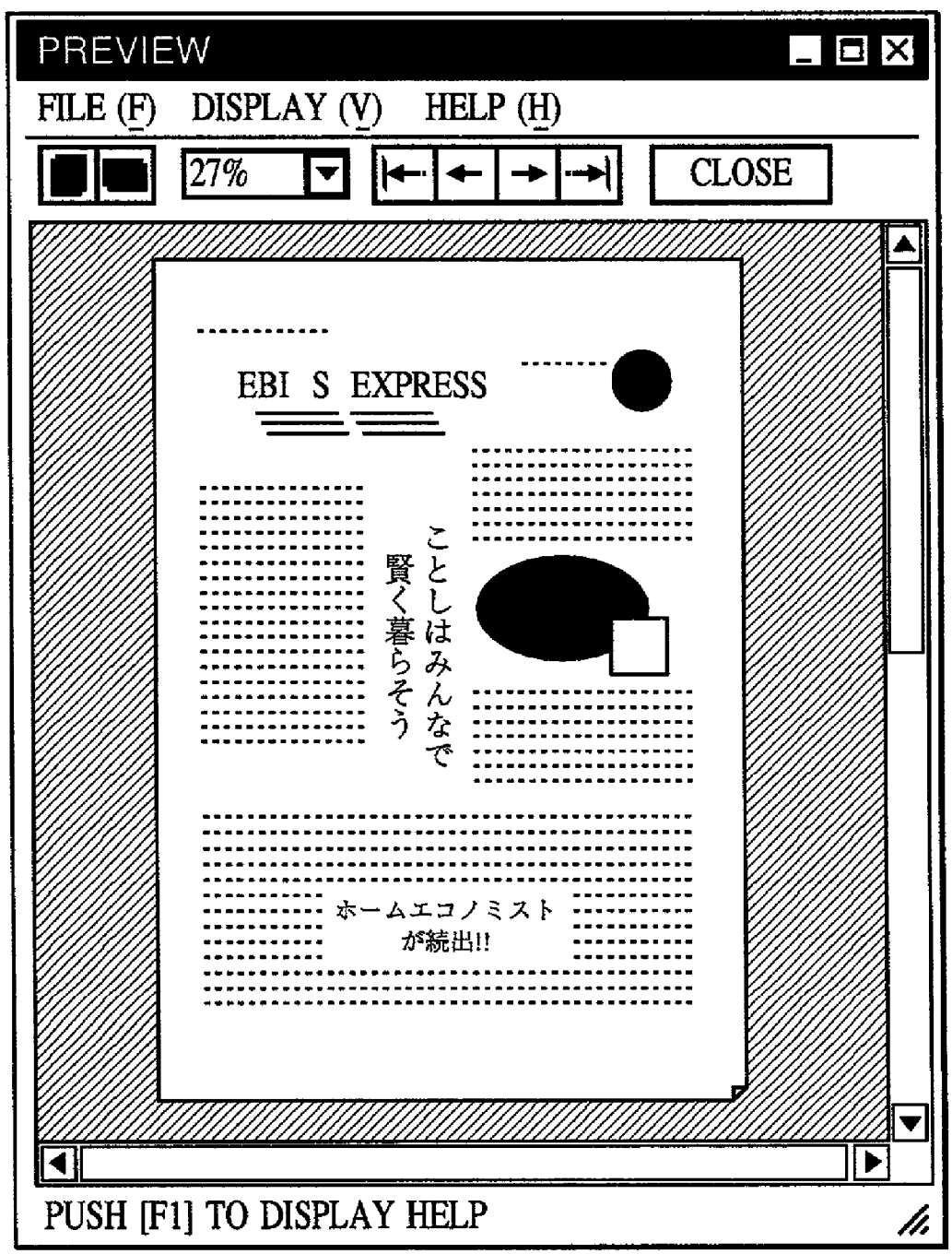
FIG. 17 shows one example of a screen of a previewer.

With the preview processing executed as described above, a large-size preview is displayed by the previewer 306 on the screen, as shown in FIG. 17, in accordance with the print processing settings contained in the spool file 303. Thereafter, when users instruct a non-display, the previewer 306 is closed and the control is shifted to the window screen (FIG. 16) of the spool file manager 304.

Then, when users want to print data in accordance with the particulars displayed by the previewer 306, they designate "print" or "print after saving" on the screen of the spool file manager 304, whereupon a print request is issued. In response to the print request, as described above, the despooler 305 processes the page description file in accordance with the job setting file, and produces GDI functions which are sent to the graphic engine 202. Then, print commands are sent to the printer driver 203 via the dispatcher 301, whereby printing is executed.

Setting change by the setting change editor 307 is described below.

As with preview processing, the setting change is performed for a job for which "store" has been designated in the screen of FIG. 9. Through a similar flow to that described above, the spool file manager 304 is popped up and spooled jobs are listed up. When "job edit" is designated and the setting change is instructed on the window screen (FIG. 16) of the spool file manager 304, the spool file manager loads the setting change editor 307, which is stored in the external memory 111, into the RAM 102 and then instructs the setting change editor 307 to display the current or default processing settings. Responsively, a job setting screen is displayed as shown in FIG. 18.

Figure 18:
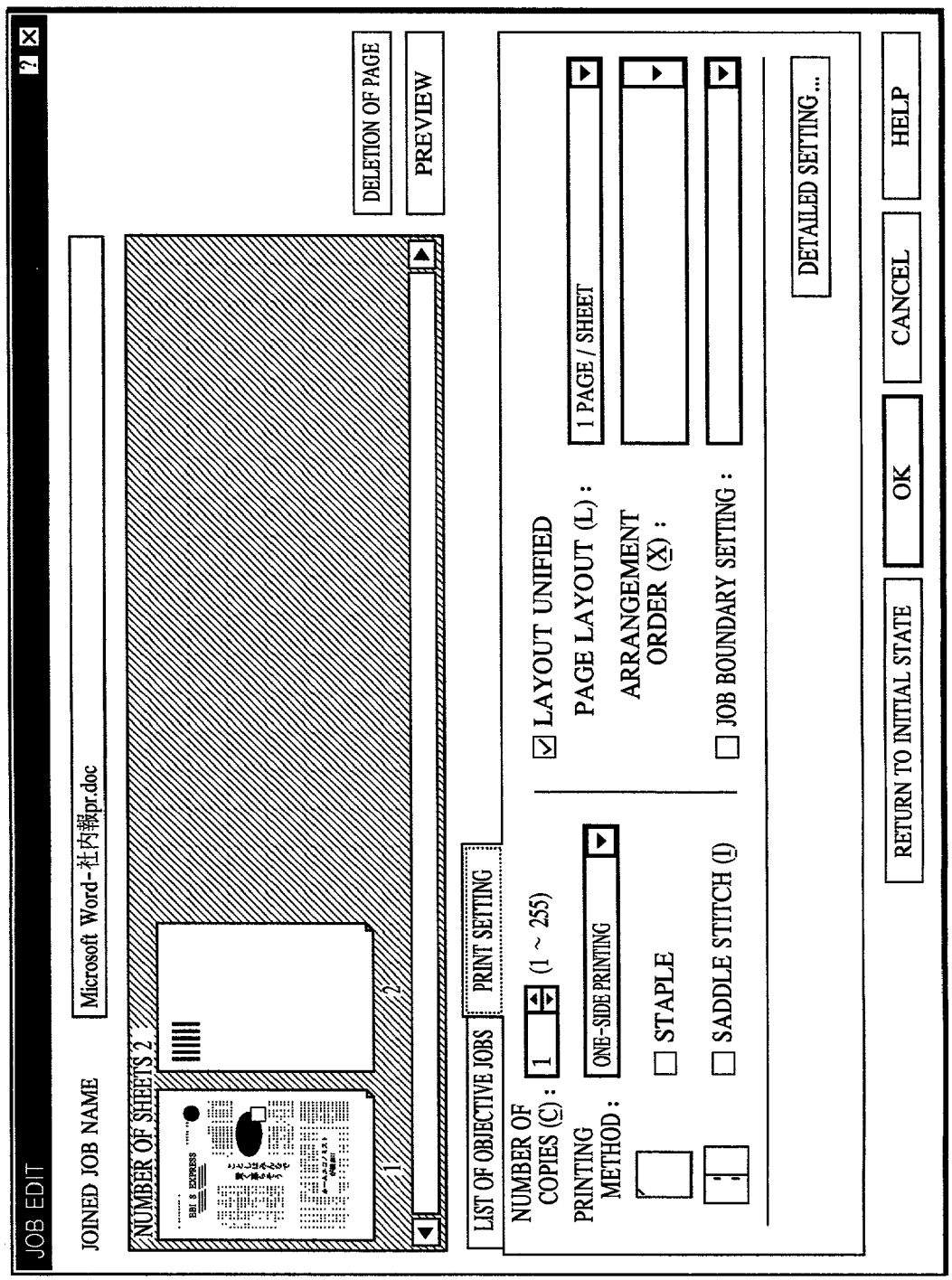
FIG. 18 shows one example of a screen of the setting change editor.

The setting change editor 307 acquires a job setting file of the job, for which "job edit" has been designated, from the spool file 303, and then changes a default value on a job setting screen of FIG. 18 in accordance with setting items designated by the job setting file. In an example of the job setting screen shown in FIG. 18, the job setting file of the job, for which "job edit" has been designated, contains items designated, by way of example, as given below; number of copies: 1, printing method: one-side printing, staple: none, and layout: 1 page/sheet.

As with the previewer 306, the setting change editor 307 processes the page description file (PDF) in the form of intermediate code, which is held in the spool file 303, in accordance with the particulars of the processing settings contained in the job setting file (SDF), which is also held in the spool file 303. Then, the graphic engine 202 outputs drawing data in its own client area, whereupon a small-size print preview is output on the screen of FIG. 18. Also, at this time, the particulars of the processing settings contained in the job setting file, which is stored in the spool file 303, is changeable and modifiable. To that end, settable items of the printer driver 203 are displayable on a user interface provided by the setting change editor 307, or on a user interface called from the printer driver 203 itself. As shown in FIG. 18, it is possible to designate the number of copies, the printing method (one-side, both-side and binding), staple (e.g., saddle finisher), page layout, arrangement order, etc. Also, by depressing "detailed setting" in FIG. 18, most of items designateable by the printer driver are settable again. However, it is assumed that change of the settings related to printing quality, such as resolution and graphic mode, is not allowed.

The items thus changed are verified for the changes in response to a verification request issued from the setting change editor 307, and then the control is shifted to the spool file manager 304. The items having been verified for the changes are stored. At this time, those changes of the print settings are stored not in the original job setting file, but in a newly created job output setting file, which is used for job editing, etc. Details of the job output setting file are described later with reference to the drawings subsequent to FIG. 10.

Then, when users want to print data in accordance with the changed particulars of the settings after similar verification to that in the preview processing by the previewer 306, a print request is issued from the spool file manager 304. The print request is sent to the graphic engine 202, and print commands are sent to the printer driver 203 via the dispatcher 301, whereby the printing is executed.

Further, on the window screen (FIG. 16) of the spool file manager 304, the operation of joining a plurality of print jobs to be printed as one print job are designateable by users. As with the processing for preview and setting change, the join processing is also made on a job for which "store" is designated as an output target in the property of the printer drive shown in FIG. 9.

When joining a plurality of print jobs, users first call the printer driver 203 from the application 201 and then select "store" on the user interface shown in FIG. 9. Similarly to the above-described processing, upon the selection of "store", a designated job is stored in the spool file 303, and the window screen (FIG. 16) of the spool file manager 304 is popped up. The spooled job is listed up on the window of the spool file manager. By repeating the similar operation from the application 201, a list of plural jobs is displayed on the spool file manager 304.

When a plurality of jobs are selected and "join" is designated, the spool file manager 304 loads the setting change editor 307, which is stored in the external memory 111, into the RAM 102 and then instructs the setting change editor 307 to display the job at the top of the list or the default processing settings. Responsively, a join setting screen is displayed as shown in FIG. 18. While the setting change editor 307 is used as the join setting screen in this embodiment, another module may be used to display the join setting screen.

The setting change editor 307 processes the page description file in the form of intermediate code, which is held in the spool file 303, in accordance with the particulars of the processing settings contained in the job setting file which is also held in the spool file 303. Then, the graphic engine 202 outputs all designated jobs, as jobs to be joined, in its own client area, whereupon an output onto the screen is made. On that occasion, small-size print previews of all the selected jobs are displayed in a preview area of the screen of FIG. 18. Further, when creating a joined job, a new job output setting file is created as being expanded from respective job output setting files for the individual jobs. The job output setting file is also created whenever job editing is performed, that is, it is created in a one-to-one relation to one job. Thus, one job output setting file is created for the joined job.

The print preview is displayed in accordance with the processing settings changed and modified for the respective jobs before joined together, or is displayed in accordance with the unified processing settings changed and modified for one job after being joined. On that occasion, settable items of the printer driver 203 may be displayed on a user interface provided by the setting change editor 307, or on a user interface called from the printer driver 203 itself.

As with the above-described processing, the joined job and the changed items are verified for the changes in response to a verification request issued from the setting change editor 307, and then the control is shifted to the spool file manager 304. Through those operations, the previously selected plural jobs are displayed as one joined job on the window screen of the spool file manager 304.

Then, when users want to print data in accordance with the changed particulars of the settings after similar verification to that in the preview processing by the previewer 306, a print request is issued from the spool file manager 304. The print request is sent to the graphic engine 202, and print commands are sent to the printer driver 203 via the dispatcher 301, whereby the printing is executed.

Figure 4:
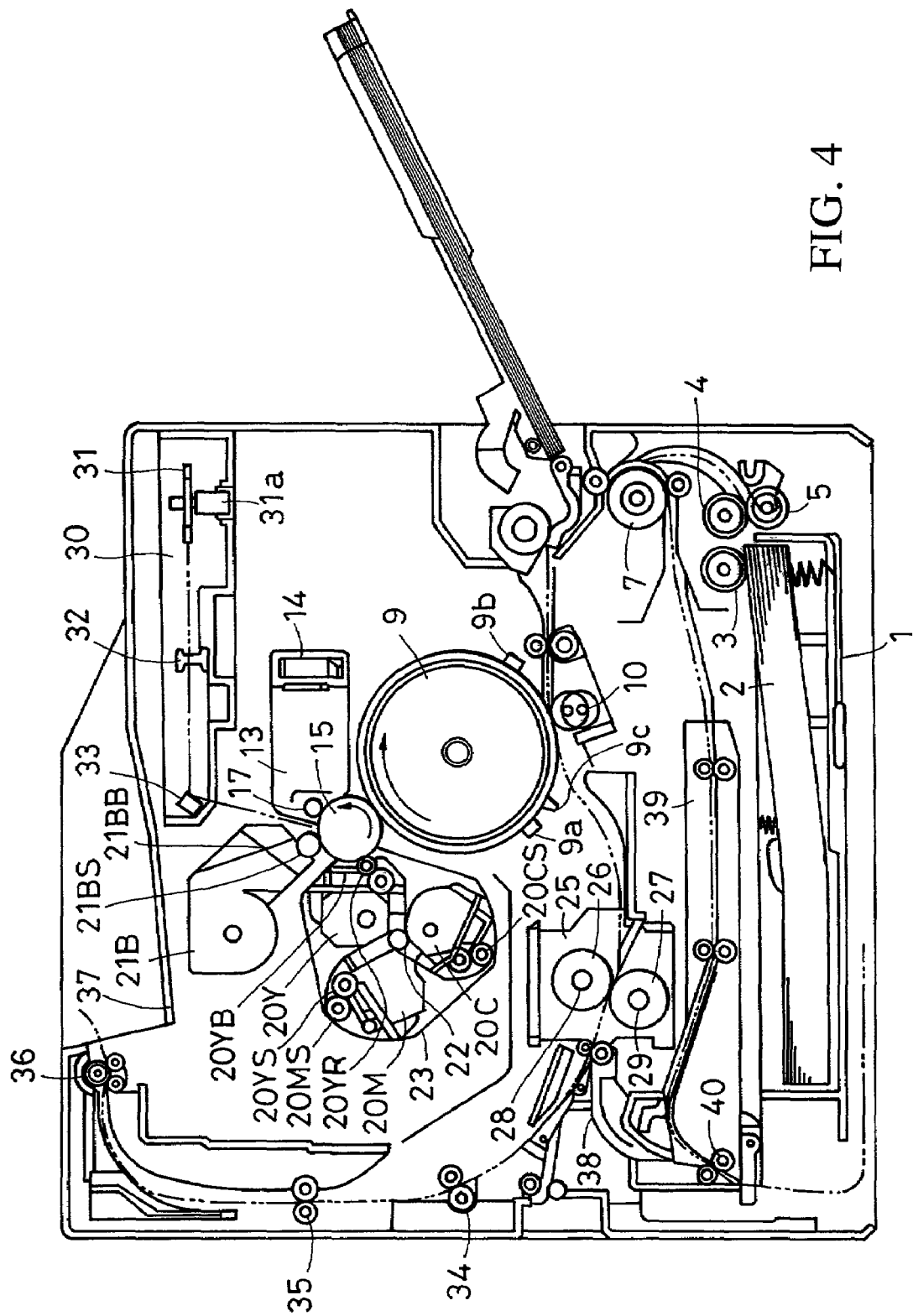
FIG. 4 is a sectional view for explaining a printer used in the present invention.

FIG. 4 is a sectional view of a color laser printer, as one example of the printer 1500, which has the function of both-side printing.

In the printer of FIG. 4, an electrostatic latent image is formed on a photoconductive drum 15 by scanning a laser beam over the photoconductive drum 15 through a polygonal mirror 31, the laser beam being modulated in accordance with image data for each color, which is obtained from print data input from the host computer 3000. Each electrostatic latent image is developed with toner to obtain a visible image. The visible toner images of all colors are multi-transferred onto an intermediate transfer body 9 to form a full-color visible image. Then, the full-color visible image is transferred onto a transfer material 2 and fused on it. An image forming section for performing the above-mentioned control comprises a drum unit 13 including the photoconductive drum 15, a primary charging section including a contact charging roller 17, a cleaning section, a developing section, the intermediate transfer body 9, a sheet feeding section including a sheet cassette 1 and various rollers 3, 4, 5 and 7, a transfer section including a transfer roller 10, and a fusing section 25.

The drum unit 13 is constructed as an integral assembly comprising the photoconductive drum (photoconductor) 15 and a cleaner container 14 which serves also as a holder for the photoconductive drum 15 and includes a cleaning mechanism. The drum unit 13 is detachably supported to a printer body so that it is easily replaced by a new one in match with the life of the photoconductive drum 15. The photoconductive drum 15 is constructed by coating an organic photoconductor layer over an outer circumference of an aluminum cylinder, and is rotatably supported by the cleaner container 14. The photoconductive drum 15 is rotated with driving forces transmitted from a drive motor (not shown), and the drive motor rotates the photoconductive drum 15 counterclockwise in sync with the image forming operation. An electrostatic latent image is formed by selectively exposing a surface of the photoconductive drum 15 to a laser beam. In a scanner section 30, a modulated laser beam is reflected by the polygonal mirror 31, which is rotated by a motor 31*a* in sync with a horizontal sync signal of an image signal, for irradiation to the photoconductive drum 15 through a lens 32 and a reflecting mirror 33.

For developing the electrostatic latent images to visible images, the developing section comprises three color developing units 20Y, 20M and 20C for developing the latent images with toner of yellow (Y), magenta (M) and cyan (C), and one black developing unit 21B for developing the latent image with toner of black (B). The color developing units 20Y, 20M and 20C and the black developing unit 21B include respectively sleeves 20YS, 2OMS, 20CS and 21BS, and applying blades 20YB, 20MB, 20CB and 21BB held in pressure contact with outer circumferences of the sleeves 20YS, 20MS, 20CS and 21BS. Also, the three color developing units 20Y, 20M and 20C include respectively coating rollers 20YR, 20MR and 20CR.

Furthermore, the black developing unit 21B is detachably attached to the printer body, whereas the color developing units 20Y, 20M and 20C are detachably attached to a developing rotary 23 rotating about a rotary shaft 22.

The sleeve 21BS of the black developing unit 21B is arranged with a small gap of, e.g., about 300 µm from the photoconductive drum 15. In the black developing unit 21B, toner is carried toward the sleeve 21BS by a feeding member built therein and is charged by friction charging so that the toner is coated by the coating blade 21BB on the outer circumference of the sleeve 21BS which is rotated clockwise. Also, a development bias is applied to the sleeve 21BS, whereby the electrostatic latent image on the photoconductive drum 15 is developed to form a visible image on the photoconductive drum 15 with the black toner.

During the image forming process, the three color developing units 20Y, 20M and 20C are rotated with rotation of the developing rotary 23 such that a predetermined one of the sleeves 20YS, 20MS and 20CS is successively positioned to face the photoconductive drum 15 with a small gap of, e.g., about 300 µm from the drum 15. Thus, a predetermined one of the color developing units 20Y, 20M and 20C is successively stopped at a developing position opposed to the photoconductive drum 15, and each visible toner image is formed on the photoconductive drum 15.

During the color image forming process, the developing rotary 23 is rotated per rotation of the intermediate transfer body 9 to carry out developing steps by the yellow developing unit 20Y, the magenta developing unit 20M, the cyan developing unit 20C, and the black developing unit 21B in that order. While the intermediate transfer body 9 is rotated four times, the visible toner images of yellow, magenta, cyan and black are formed in sequence. As a result, a full-color image is formed on the intermediate transfer body 9.

The intermediate transfer body 9 is constructed such that it contacts the photoconductive drum 15 and rotates with the rotation of the photoconductive drum 15. During the color image forming process, the intermediate transfer body 9 is rotated clockwise and receives four visible images from the photoconductive drum 15 through multiple transfers. Also, during the image forming process, the transfer roller 10 (described later) is brought into contact with the intermediate transfer body 9 to feed the transfer material 2 while holding the transfer material 2 between them, whereby the color visible images on the intermediate transfer body 9 are simultaneously multi-transferred onto the transfer material 2. Around the outer circumference of the intermediate transfer body 9, there are disposed a TOP sensor 9*a* and an RS sensor 9*b* for detecting an angular position of the intermediate transfer body 9 in the rotating direction thereof, and a density sensor 9*c* for detecting a density of the toner image transferred onto the intermediate transfer body 9.

The transfer roller 10 includes a transfer charger supported to be able to move into contact with or away from the intermediate transfer body 9, and it is constructed by winding a medium-resistance foamed elastomer over a metal shaft.

As indicated by a solid line in FIG. 4, the transfer roller 10 is held in a lower position away from the intermediate transfer body 9 so as not to disturb the color visible images during the process in which the color visible images are multi-transferred onto the intermediate transfer body 9. After the four color visible images have all been formed on the intermediate transfer body 9, the transfer roller 10 is moved to an upper position, indicated by a dotted line, by a cam member (not shown) in match with the timing at which the color visible images are transferred onto the transfer material 2. In that upper position, the transfer roller 10 is brought into pressure contact with the intermediate transfer body 9 under a predetermined pressing force through the transfer material 2. At the same time, a bias voltage is applied to the transfer roller 10, whereupon the color visible images on the intermediate transfer body 9 are transferred onto the transfer material 2.

The fusing section 25 is to fuse the color visible images transferred onto the transfer material 2 while the transfer material 2 is transported. The fusing section 25 comprises a fusing roller 26 for heating the transfer material 2 and a pressing roller 27 for bringing the transfer material 2 into pressure contact with the fusing roller 26. The fusing roller 26 and the pressing roller 27 are of a hollowed structure and include respectively heaters 28, 29 disposed in inner spaces. In other words, the transfer material 2 including the color visible images is transported by the fusing roller 26 and the pressing roller 27. During the transport, heat and pressure are applied to fuse and fix the toner on the surface of the transfer material 2.

After the fusing of the color visible images, the transfer material 2 is ejected to a sheet output section 37 by sheet ejection rollers 34, 35 and 36.

The cleaning section is to remove the toner remaining on both the photoconductive drum 15 and the intermediate transfer body 9. The waste toner remaining after the visible toner image formed on the photoconductive drum 15 has been transferred onto the intermediate transfer body 9, and the waste toner remaining after the four color visible images formed on the intermediate transfer body 9 have been transferred onto the transfer material 2, are removed and accumulated in the cleaner container 14.

The transfer material (recording sheet) 2, on which an image is to be printed, is taken out of a sheet supply tray 1 by a sheet feed roller 3. Then, while the transfer material 2 is fed to pass between the intermediate transfer body 9 and the transfer roller 10, a full-color toner image is recorded on the transfer material 2. Then, the transfer material 2 passes the fusing section 25 where the toner image is fused. In the case of one-side printing, a guide 38 is positioned to form a feed path so that the recording sheet is guided to the upper sheet output section. In the case of both-side printing, the guide 38 is positioned to form a feed path so that the recording sheet is guided to a lower both-side printing unit.

The recording sheet guided to the both-side printing unit is introduced by a feed roller 40 into a space below the tray 1 (i.e., a feed path indicated by a two-dot-chain line), and then transported backward into a both-side printing tray 39. On the both-side printing tray 39, the sheet lies the upside down in a reversed relation to one lying on the sheet supply tray 1, and is fed in a direction reversed in the front and rear side with respect to one fed from the sheet supply tray 1. The sheet fed from the both-side printing tray 39 in such a condition is again subjected to transfer and fusing of a toner image, whereby the both-side printing on one sheet is completed.

Figure 5:
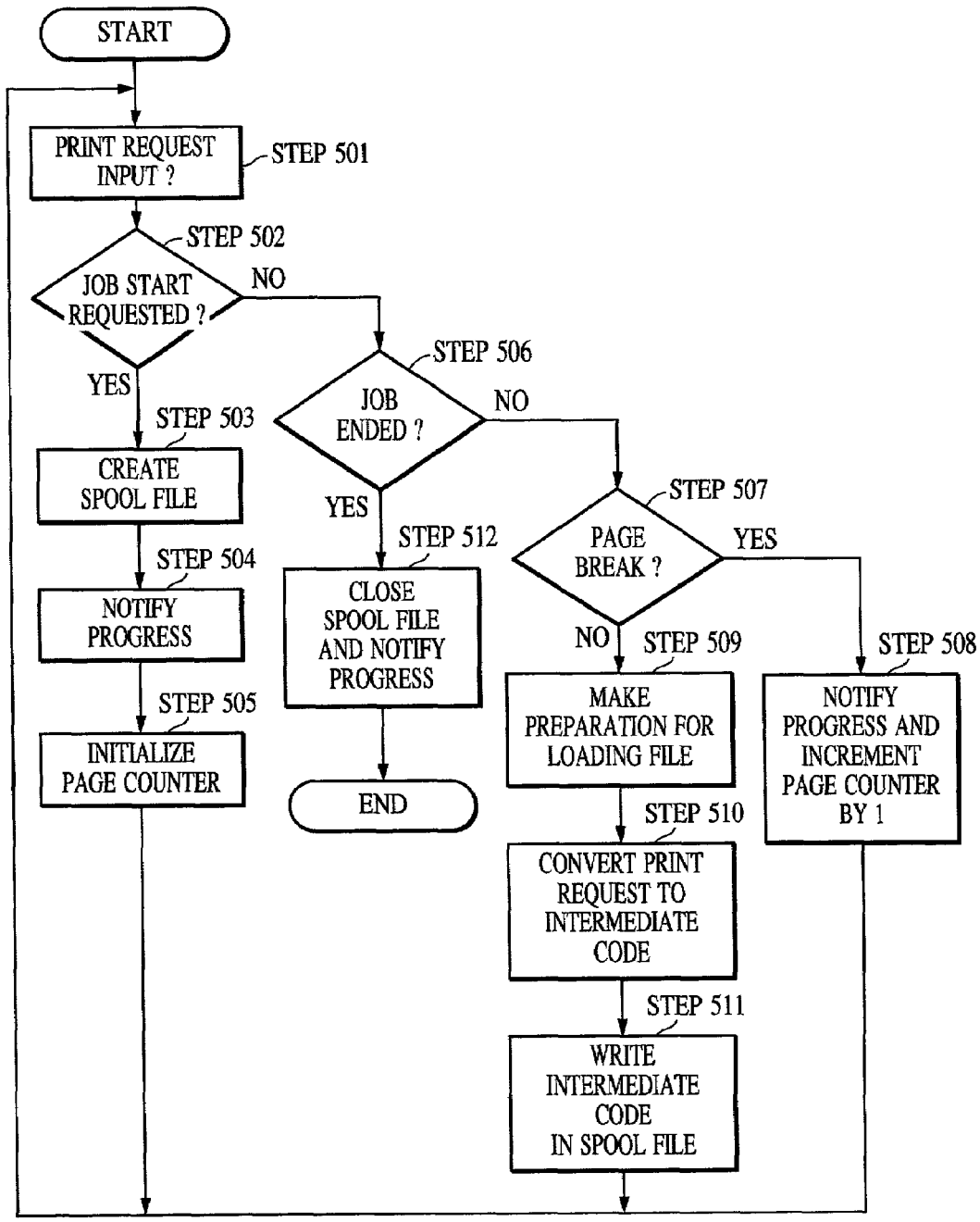
FIG. 5 is a flowchart showing the processing executed in a spooler.

FIG. 5 is a flowchart showing the processing executed by the spooler 302 in a step of storing data in units of page in creation of the spool file 303.

Figure 8:
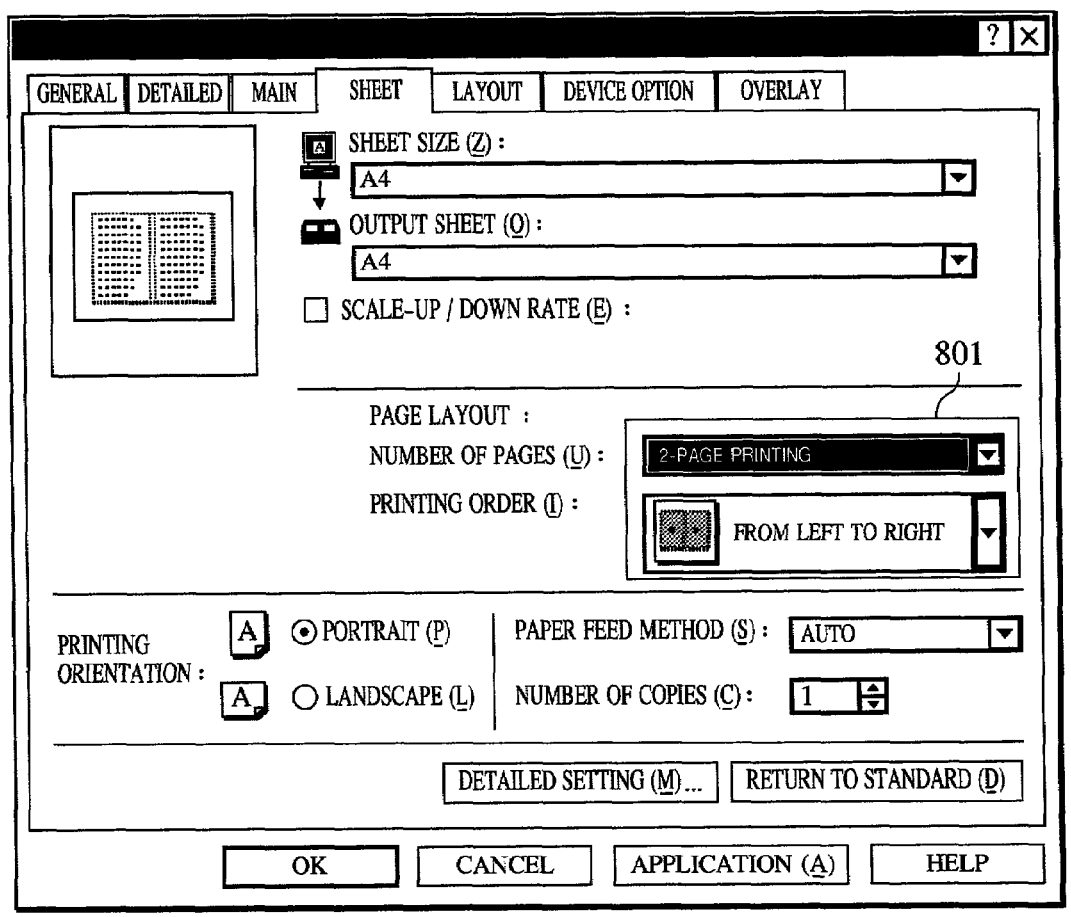
FIG. 8 shows one example of a print setting screen.

In step 501, the spooler 302 receives a print request from the application through the graphic engine 202. The application displays a dialogue box for entry of print settings as shown FIG. 8, and the print settings entered from the dialogue box are transferred to the spooler 302 by the printer driver. The setting entry dialogue box shown in FIG. 8 includes, e.g., a setting item to decide the number of logical pages to be arranged on one physical page, as denoted by 801.

In step 502, the spooler 302 determines whether the received print request is a job start request. If it is determined in step 502 that the received print request is a job start request, the spooler 302 proceeds to step 503 and creates a new spool file 303 for temporarily storing intermediate data. Subsequently, in step 504, the spooler 302 notifies the progress of the processing for creation of the intermediate data to the spool file manager 304. In the next step 505, the spooler 302 initializes a page number counter to one (1). At this time, the spool file manager 304 reads and stores, from the spool file 303, the job information and the print settings of a job for which the processing to create the intermediate data has started.

On the other hand, if it is determined in step 502 that the received print request is not a job start request, the spooler 302 proceeds to step 506.

In step 506, the spooler 302 determines whether the received print request is a job end request. If it is not a job end request, the spooler 302 proceeds to step 507 and determines whether it is a page break request. If it is determined in step 507 that the received print request is a page break request, the spooler 302 proceeds to step 508 and notifies the progress of the processing for creation of the intermediate data to the spool file manager 304. Then, the spooler 302 increments the page number counter, closes the page description file storing the intermediate code, and creates the next page description file. Thus, the page description file is created in units of logical page output from the application.

If it is determined in step 507 that the received print request is not a page break request, the spooler 302 proceeds to step 509 and prepares for writing intermediate code in the page description file.

In step 510, for loading the print request in the spool file 303, the spooler 302 converts DDI functions of the print request to intermediate code. In step 511, the spooler 302 writes the print request (intermediate code), which has been converted in Step 510 to a loadable form, in the page description file prepared in the spool file 303. Thereafter, the spooler 302 returns to step 501 and receives another print request from the application. A series of processing from step 501 to 511 is repeated until receiving a job end request (End Doc) from the application. At the same time, the spooler 302 acquires information, such as processing settings stored in the DEVMODE structure, from printer driver 203 and stores the information as a job setting file in the spool file 303. If it is determined in step 506 that the print request received from the application is a job end request, this means that all the print requests from the application are completed. Therefore, the spooler 302 proceeds to step 512 and notifies the progress of the processing for creation of the intermediate data to the spool file manager 304, whereby the processing is ended.

Figure 6:
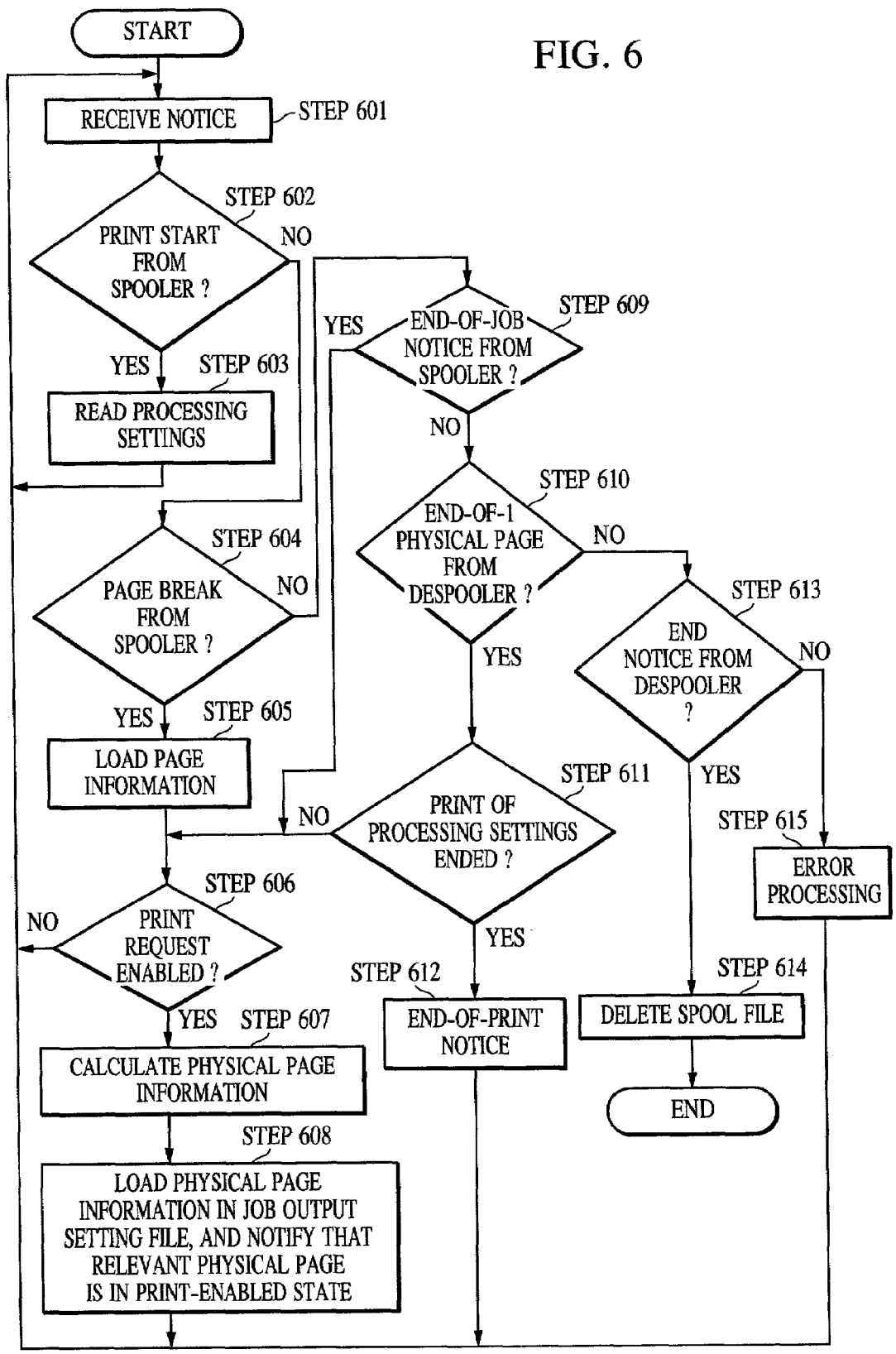
FIG. 6 is a flowchart showing printing control executed in a spool file manager.

FIG. 6 is a flowchart showing details of control between the above-described process of creating the spool file 303 and a process of creating print drawing data, described below, which is executed in the spool file manager 304.

In step 601, the spool file manager 304 receives the notice of the progress of the processing for creation of the intermediate data from the spooler 302 or the despooler 305.

In step 602, the spool file manager 304 determines whether the received notice of the progress is the start-of-print notice from the spooler 302 notified in above-described step 504. If so, the spool file manager 304 proceeds to step 603 and reads print processing settings from the spool file 303, thereby starting job management. If it is determined in step 602 that the received notice of the progress is not the start-of-print notice from the spooler 302, the spool file manager 304 proceeds to step 604 and determines whether the received notice of the progress is the notice of end of creation of the intermediate data for one logical page (i.e., the page break notice) from the spooler 302 notified in above-described step 508. If so, the spool file manager 304 proceeds to step 605 and loads logical page information for the one logical page. Then, in step 606, the spool file manager 304 determines whether printing of one physical page can be started for n logical pages which have been spooled at that time. If the printing can be started, the spool file manager 304 proceeds to step 607 and decides the physical page number from the number of logical-pages allocated to one physical page to be printed.

The physical page number is calculated as follows. For example, when the processing settings are set so as to arrange four logical pages on one physical page (in the case of 4-page printing for a 4-zone post card), one physical page can be printed as the first physical page at the time the fourth logical page has been spooled. Then, the second physical page can be printed at the time the eighth logical page has been spooled.

Also, even when the total number of logical pages is not a multiple of the number of logical pages to be arranged on one physical page, the number of logical pages arranged on one physical page can be decided with the notice of end of spooling notified in step 512.

Figure 10:
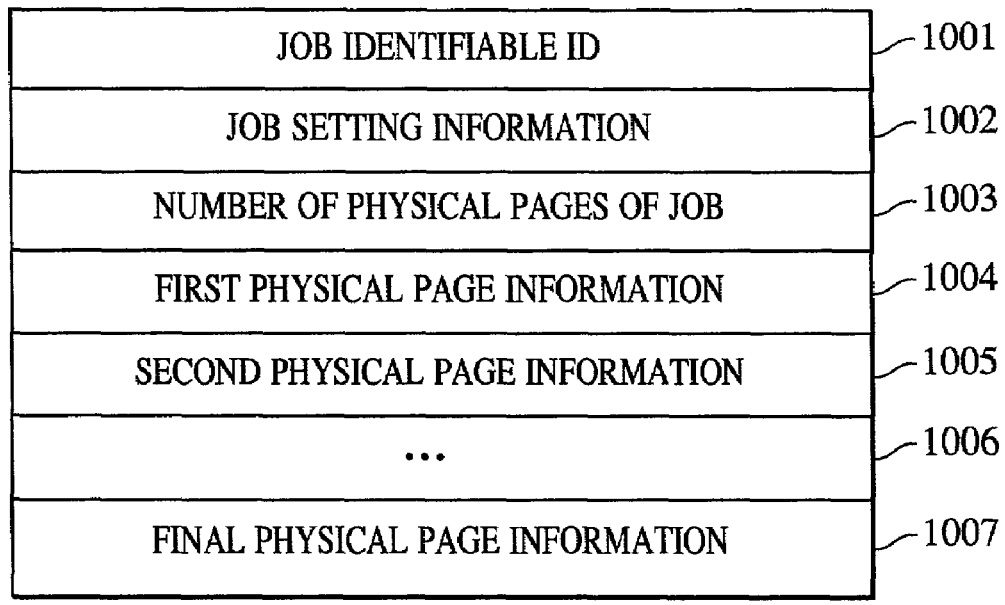
FIG. 10 shows one example of a job output setting file.

In step 608, information, such as the logical page numbers making up one physical page, for which printing has been enabled, and the physical page number, is stored in a job output setting file (file including physical page information) in the format shown in FIG. 10, and the fact that the physical page information for one physical page has been added is notified to the despooler 305. Thereafter, the spool file manager 304 returns to step 601 and waits for a next notice. In this embodiment, the print processing is started at the time spooling of one page (i.e., n logical pages in the N-page printing; that is, all logical pages making up one physical page) has been completed, even if spooling of all print jobs is not yet completed.

On the other hand, if it is determined in step 604 that the received notice of the progress is not the notice of end of creation of the intermediate data for one logical page (i.e., the page break notice) from the spooler 302, the spool file manager 304 proceeds to step 609 and determines whether the received notice is the end-of-job notice from the spooler 302 notified in above step 512. If it is the end-of-job notice, the spool file manager 304 proceeds to above step 606. If it is not the end-of-job notice, the spool file manager 304 proceeds to step 610 and determines whether the received notice is the notice of end of print of one physical page from the despooler 305. Then, if the received notice is the notice of end of print of one physical page, the spool file manager 304 proceeds to step 611 and determines whether all the print processing in accordance with the processing settings is completed. If all the print processing in accordance with the processing settings is completed, the spool file manager 304 proceeds to step 612 and notifies the end of print to the despooler 305.

If it is determined in step 611 that the print processing in accordance with the processing settings is not yet completed, the spool file manager 304 proceeds to above step 606. In this embodiment, the despooler 305 is assumed to execute the print processing in units of one physical page. Also, above step 608 is assumed to store, in a file, information necessary for executing the print processing of one physical page whenever the page is printed, so that the information is again utilized. However, when such information is not required to be utilized again, a high-speed medium, such as a common memory, may be used to overwrite the information in units of one physical page. That storing method contributes to an increase in speed and a saving of resources. Further, when the progress of spooling is faster than that of despooling, or when despooling is started after the end of spooling of all pages, above step 608 may be modified to issue, depending upon the progress on the despooling side, a notice to notify the fact that printing of plural physical pages or all physical pages is enabled, rather than issuing a notice of print capability for each physical page. That modification contributes to a saving of the number of times at which notices are issued.

If it is determined in step 610 that the received notice is not the notice of end of print of one physical page from the despooler 305, the spool file manager 304 proceeds to step 613 and determines whether the received notice is the end-of-print notice from the despooler 305. If the received notice is the end-of-print notice from the despooler 305, the spool file manager 304 proceeds to step 614 and deletes the relevant page description file in the spool file 303, whereby the processing is ended. On the other hand, if the received notice is not the end-of-print notice from the despooler 305, the spool file manager 304 proceeds to step 615 to execute other usual processing, and then waits for a next notice.

Figure 7:
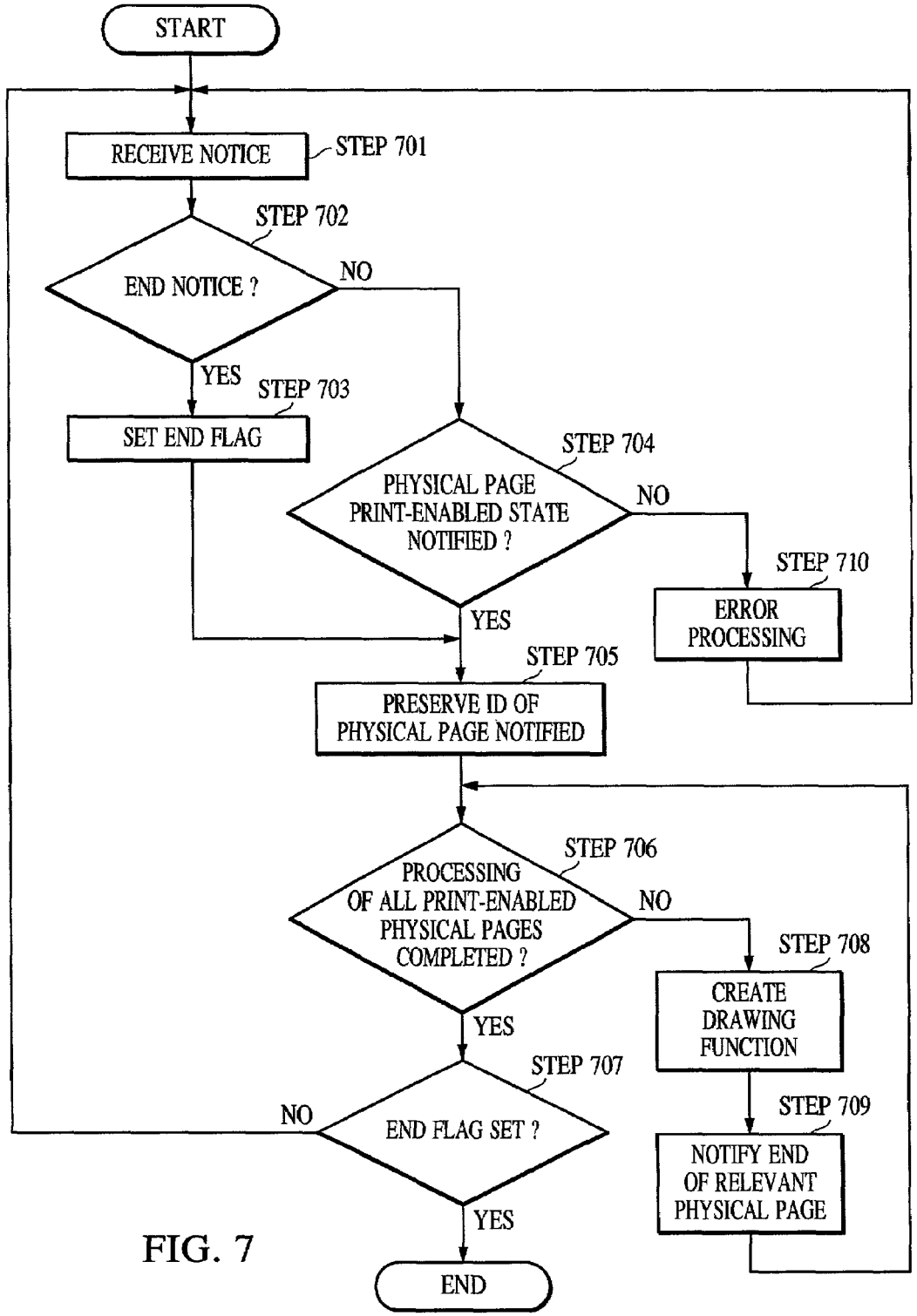
FIG. 7 is a flowchart showing the processing executed in a despooler.

FIG. 7 is a flowchart showing details of the processing to produce first-type drawing functions, which is executed in the despooler 305.

In response to a print request from the spool file manager 304, the despooler 305 reads necessary information (page description file and job setting file) from the spool file 303 and produces first-type drawing functions. The produced first-type drawing functions are transferred to the printer in the same manner as described above with reference to FIG. 3.

For producing the first-type drawing functions, in step 701, the despooler 305 receives a notice from the spool file manager 304. Then, in step 702, the despooler 305 determines whether the received notice is the end-of-job notice. If the received notice is the end-of-job notice, the despooler 305 proceeds to step 703 and sets an end flag. Subsequently, the despooler 305 proceeds to step 705. If it is determined in step 702 that the received notice is not the end-of-job notice, the despooler 305 proceeds to step 704 and determines whether the request for start of print of one physical page, issued in step 608, is notified. Then, if it is determined in step 704 that the request for start of print is not notified, the despooler 305 proceeds to step 710 to execute other error processing, and then returns to step 701 to waits for a next notice.

On the other hand, if it is determined in step 704 that the request for start of print of one physical page is notified, the despooler 305 proceeds to step 705 and preserves the ID of each of print-enabled physical pages notified in step 704. Then, in step 706, the despooler 305 determines whether the print processing is completed for all pages corresponding to the physical page IDs preserved in step 705. If the processing of all physical pages is completed, the despooler 305 proceeds to step 707 and determines whether the end flag has been set in above step 703. If the end flag is set, this is regarded as indicating the end of print of job. Then, a notice of end of processing in the despooler 305 is notified to the spool file manager 304, and the processing is ended. If it is determined in step 707 that the end flag is not set, the despooler 305 returns to step 701 and waits for a next notice.

If it is determined in step 706 that any of print-enabled physical pages remains, the despooler 305 proceeds to step 708 and successively reads ones of the preserved physical page IDs, which are not yet processed, and reads information required to produce drawing functions for physical pages corresponding to the read physical page IDs, thereby executing the print processing. Herein, the print processing means one for converting, in the despooler 305, print request commands in the form of intermediate data, which is stored in the spool file 303, to the form (GDI functions) recognizable by the graphic engine 202, and then transferring the converted GDI functions.

In the case of processing settings (i.e., N-page printing) in which plural logical pages are arranged on one physical page as with this embodiment, the conversion in step 708 is executed in consideration of scale-down layout of the plural logical pages. If the required print processing is completed, the despooler 305 notifies, in step 709, the end of creation of the first-type drawing functions for one physical page to the spool file manager 304. Then, the despooler 305 again returns to step 706 and repeats the above-described steps until the print processing is completed for all the print-enabled physical page IDs preserved in step 705.

The foregoing is a flow of the print processing using the dispatcher 301, the spooler 302, the spool file manager 304, and the despooler 305. Through the processing described above, the application 201 is released from the print processing at the timing at which the spooler 302 creates intermediate code and stores it in the spool file 303, and hence a period of until return to the application is shorter than the case of outputting print commands directly to the printer driver 203. Also, since print data is temporarily stored in the spool file 303 as intermediate files (page description file and job setting file) in accordance with print settings of the printer driver, users are able to recognize a print preview to be actually printed, and are able to join or rearrange a plurality of print jobs created by the application. Further, even in the case of changing the print settings, users are able to change the print settings without again booting up the application and printing data for confirmation of the change.

In the print processing using the spooler 302, a job output setting file is created upon a print request being issued to the graphic engine 202 from the despooler 305. A job output setting file is also created, for example, when a preview is displayed or plural jobs are joined. A job output setting file is the same as a job setting file in processing of a single job, and is created based on plural sets of job setting information in processing of a joined job. The job output setting file is described in more detail below.

FIG. 10 shows one example of a job output setting file that stores information making up print-enabled physical pages, the information being produced in step 608 by the spool file manager 304. A field 1001 stores an ID for identifying a job. Alternatively, job identification may be provided using the name of a file or common memory in which the relevant information is stored. A field 1002 stores job setting information. The job setting information contains information that is set only in a one-to-one relation to each job, such as not only a structure for starting print of job onto the graphic engine 202, but also designations of N-page printing, additional drawing (e.g., a page frame), the number of copies, and finishing (e.g., stapling). As the job setting information 1002, information is stored as much as required depending on the functions associated with the job. A field 1003 stores the number of physical pages included in the job, and indicates that physical page information for the designated number of physical pages is stored subsequent to the field 1003. In this embodiment, since the number of print-enabled physical pages is notified, the operation can be performed without the field 1003. In fields subsequent to 1004, the physical page information is stored corresponding to the number designated in the field 1003. The physical page information is described later with reference to FIG. 12.

Figure 11:
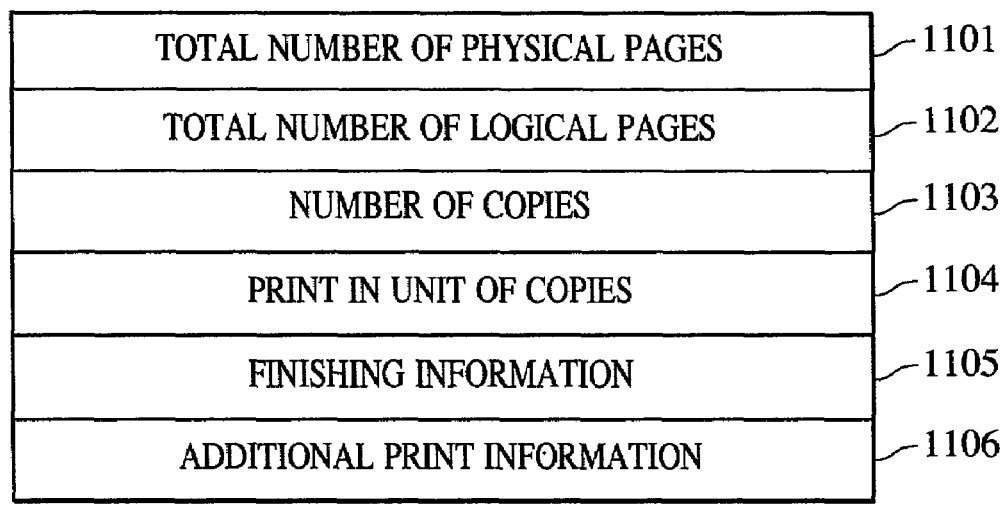
FIG. 11 shows one example of job setting information in the job output setting file.

FIG. 11 shows one example of the job setting information stored in the field 1002 of FIG. 10. A field 1101 stores the total number of physical pages. A field 1102 stores the total number of logical pages. Thus, the fields 1101 and 1102 are utilized when adding, as additional information, the number of pages to the print job. While the print processing is continued, tentative values are put in both the fields. Alternatively, the spool file manager 304 delays creation of the information for print-enabled physical pages until the print processing (i.e., the processing to produce drawing functions by the despooler 305 in this embodiment) is ended. A field 1103 stores number-of-copies information for designating how many copies are printed by the relevant print job. A field 1104 designates whether to make printing in unit of copies, when printing of plural copies is set in the field 1103. A field 1105 stores finishing information such as stapling, punching, and Z-folding. The finishing information is designated when a finisher is provided in a printer body or externally. A field 1106 stores additional print information, such as decorative lines (e.g., page frame), affixed information (e.g., date), the user name, the page number, and water mark printing, which should be added to the relevant print job. The number of fields contained in the job setting information is increased with an increase in system functions. For example, when the function of both-side printing is enabled, a field for storing designation of both-side printing is added.

Figure 12:
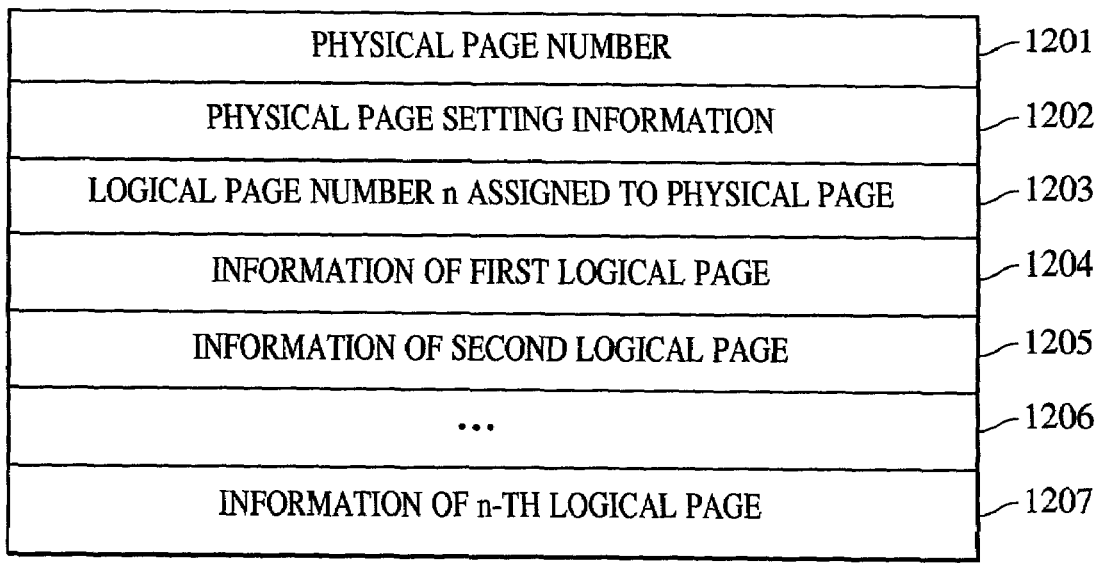
FIG. 12 shows one example of physical page information in the job output setting file.

FIG. 12 shows one example of the physical page information stored in the field 1004 of FIG. 10. A first field 1201 stores the physical page number. This field is used to manage the printing sequence and to print the physical page number additionally. A field 1202 stores physical page setting information. When layout and color/monochromatic print can be set per physical page, settings for the layout and color/monochromatic print are stored in the field 1202. A field 1203 stores the number of logical pages assigned to the relevant physical page. When four logical pages are assigned to one physical page, 4 or an ID indicating 4-page printing is stored. In fields subsequent to 1204, information of logical pages is stored corresponding to the number designated in the field 1203. Depending on the number of pages printed from the application 201, the actual number of page data is often smaller than the number of pages designated in the field 1203. Such a case is dealt with by storing, as the logical page information, special data indicating a blank page.

Figure 13:
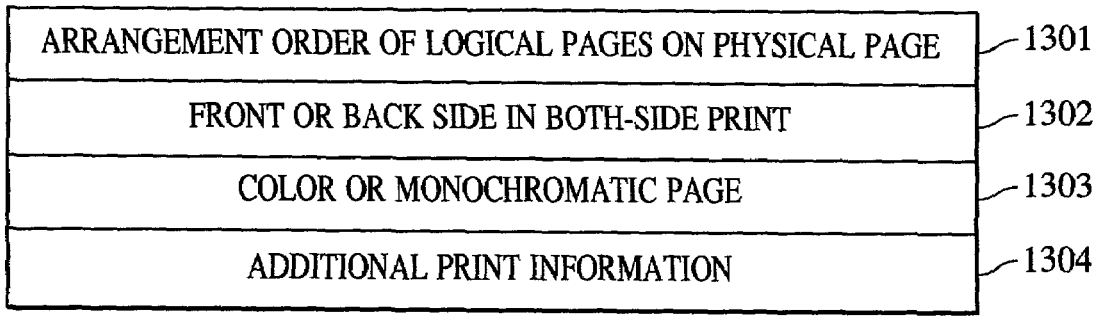
FIG. 13 shows one example of physical page setting information in the physical page information.

FIG. 13 shows one example of the physical page setting information stored in the field 1202 of FIG. 12. A field 1301 stores the arrangement order of logical pages on a physical page. The order of arranging logical pages on a physical page (e.g., sideward from an upper left position or downward from an upper left position) in N-page printing is stored in the field 1302. In some systems, the setting in the field 1301 may be replaced by storing the logical page information in the fields subsequent to 1204 in the order according to not the page number, but the arrangement order. A field 1302 stores information indicating the front or back side in both-side printing. For example, this field 1302 is used to make a binding margin uniform on both the front and back sides. A field 1303 stores a designation as to whether the relevant page is a color or monochromatic page. When a printer has both the color and monochromatic modes and a document includes color pages and monochromatic pages, this field 1303 is used to print color pages in the color mode and the monochromatic page in the monochromatic mode. This information enables the processing in a color printer to be changed per page in the auto-color mode. More specifically, transfer control is performed in accordance with the information set in the field 1303 such that, for a color page, an intermediate transfer body (such as an intermediate transfer drum or belt) or a transfer body (such as a transfer drum or belt) is rotated in number corresponding to the number of device colors, i.e., four in the YMCK system, and for a monochromatic page, it is rotated just once corresponding to black. A field 1304 stores additional print information. This field is used to print additional information, such as the page number and the date, on a physical page. The number of fields for the physical page setting information is also increased with an increase in system functions.

Figure 14:
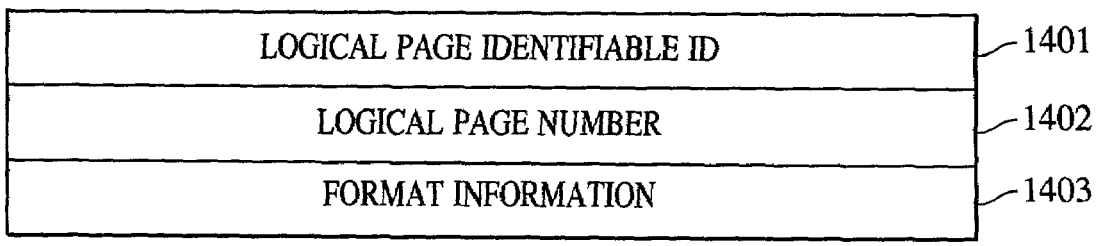
FIG. 14 shows one example of the data form transferred when a physical page print request is issued from the spool file manager to the despooler.

FIG. 14 shows one example of the logical page information stored in the field 1204 of FIG. 12. A field 1401 stores an ID of a logical page. This ID enables the intermediate code of a page description file corresponding to a logical page to be referred from the spool file 303. So long as the intermediate code of a logical page can be accessed based on the ID, the field 1401 may store a file, a memory pointer, or the intermediate code, per se, of the logical page. A field 1402 stores the logical page number. This field is used to print the logical page number as additional information or to provide auxiliary information for the logical page ID. A field 1403 stores format information including various setting items that can be designated in units of a logical page. For example, information of various settings designated per logical page, such as additional print information (e.g., page frame) and a scale-up/down rate, is stored in the field 1403.

If necessary, the field 1403 may further store attribute information of a logical page, such as color/monochromatic information per logical page. Conversely, the field 1403 can be dispensed with in a system wherein it is not required to change the settings per logical page or to set attribute information per logical page.

The job output setting file is constructed as described above. The job output setting file is also similarly constructed. Thus, the job setting file contains information associated with a job, such as print style (one-side, both-side and binding), print layout (N-up and poster), additional information (water mark, date, and the user name), the number of copies, and the sheet size. Further, the job setting file contains information per physical page, such as the arrangement order of logical pages, the front or back side in both-side printing, and the color/monochromatic mode.

In the example shown in FIG. 3, the setting change editor 307 having the function of changing the job settings is provided in addition to the expanded system described above. In this embodiment, the contents of the job settings are held in a job setting file for a single job and a job output setting file, shown in FIG. 10, for a joined job. Thus, since the contents of the job settings are independent of the page description file storing the intermediate code, the job settings can be changed by forming the job output setting file again. The setting change editor 307 forms the job output setting file again or rewrites a part thereof alone or in combination with the spool file manager 304, thereby realizing the function of changing the job settings.

Figure 15:
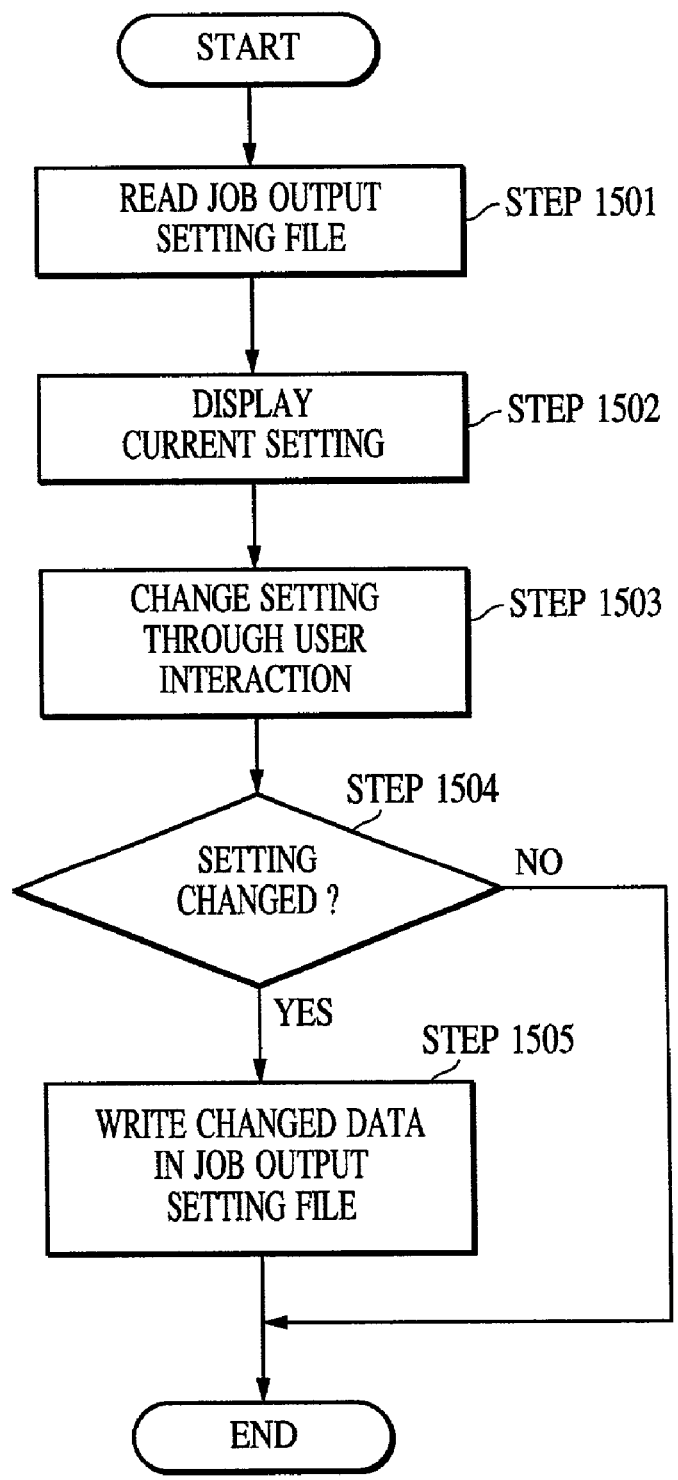
FIG. 15 is a flowchart showing a setting change process executed in a setting change editor.

FIG. 15 is a flowchart showing details of the processing to change the job settings in the setting change editor 307.

First, in step 1501, the setting change editor 307 reads a job setting file or a job output setting file. The job output setting file is the same one read by the previewer 306 and the despooler 305. Then, the setting change editor 307 proceeds to step 1502 and displays the read result to users. In step 1503, the setting change editor 307 interacts with the users through the user interface shown in FIG. 18, and changes the contents of the job settings upon, e.g., entry of designation on the menu described above. Step 1503 may be executed, instead of carrying out dialogue with users, in batch fashion in which the job settings are changed in accordance with particulars of the setting change written in a file or the like. Then, the setting change editor 307 proceeds to step 1504 and determines whether the particulars of the currently designated settings are changed from ones first read in step 1501. If there is a change, the setting change editor 307 proceeds to step 1505 to create a new job output setting file, and notifies the change to the spool file manager 304, whereby the processing is ended.

If it is determined in step 1504 that there is no change, the setting change editor 307 notifies, to the spool file manager 304, the fact that the job settings are not changed, whereby the processing is ended. After a new job output setting file has been created in step 1505, it becomes effective upon an "OK" button being selected on the user interface screen of FIG. 18, whereas the old job output setting file is deleted. Also, when the setting change is made not on the job output setting file, but on the job setting file for a single job, the old job setting file is preserved without being deleted. Further, when a "return to initial" button is depressed on the screen of FIG. 18, the new job output setting file is deleted and the old job output setting file is held effective to be reflected on a display. While the setting change editor 307 is described as being a separate module in this embodiment, it may be constituted as just a part of the user interface provided by the spool file manager 304. As another modification, the setting change editor 307 may be designed so as not to make actual writing of the changed particulars in the job output setting file, but just to notify the particulars of the setting change to the spool file manager 304. In that case, actual change of the job output setting file is performed on the side of the spool file manager 304.

Furthermore, FIG. 3 shows the expanded system having the function of joining a plurality of print jobs together and printing them as one print job. An expansion of processing to despool and preview a joined job is described below.

Usually, the spool file 303 in the form of intermediate code is created in units of a job. For a single job, since the processing is executed by successively reading the intermediate code of each logical page held in a job file to be processed, the logical page ID in the field 1401 is realized with a relative or absolute offset indicating at which position each logical page is located in the file. For a joined job, a spool file and the page information associated with the relevant job must be specified from the job ID in the field 1401. In this embodiment, an ID for identifying a spool file is added to the logical page ID for specifying the spool file. Thus, in this embodiment, a main difference between a single job and a joined job only occurs in the field 1401. This is because once the spool file is identified, page data is read in the same logic as in the processing for a single job. Also, when the spool file is stored as a separate file per logical page, the file name of each logical page may be set, as is, as the logical page ID in the field 1401.

Figure 19:
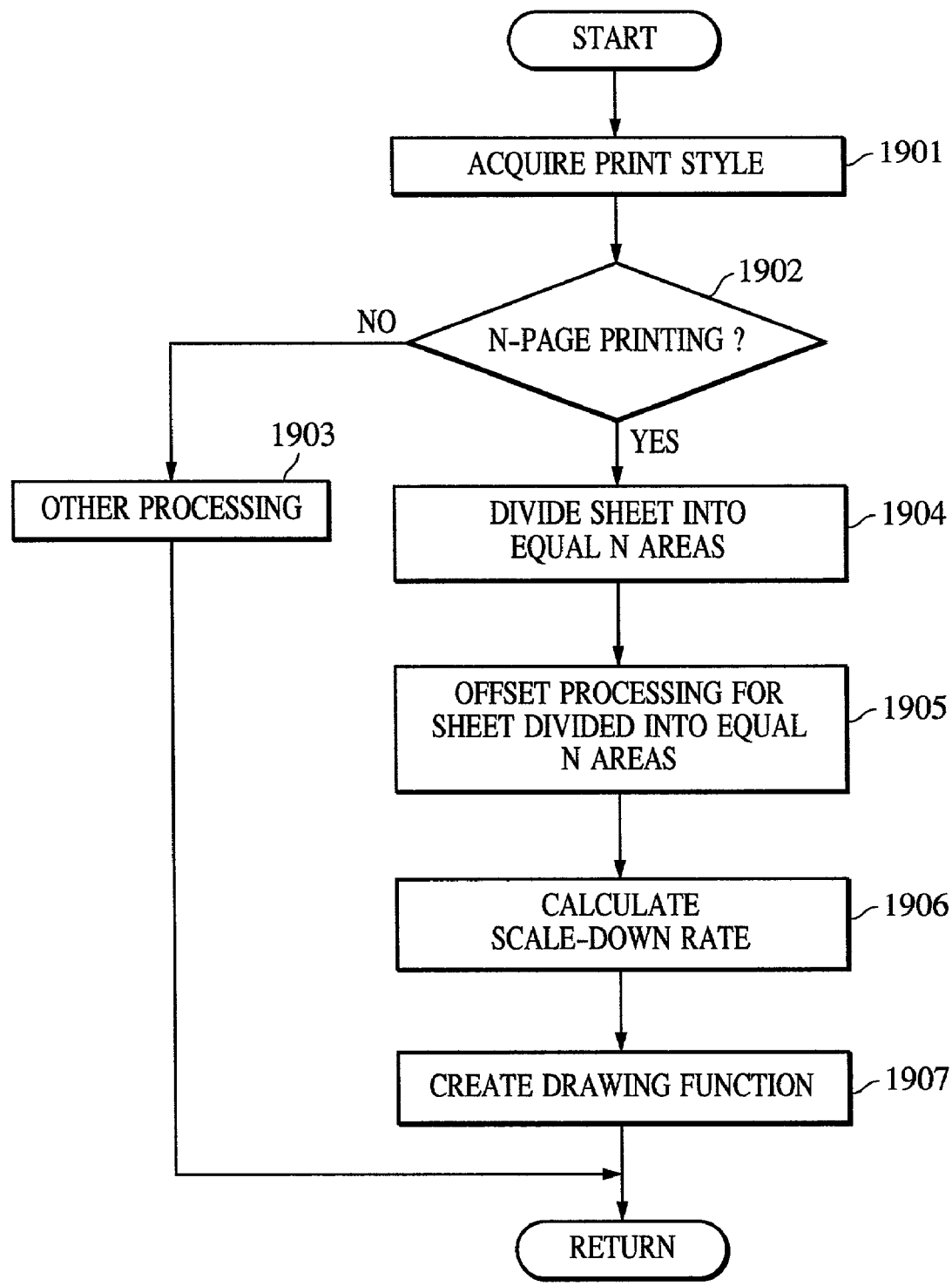
FIG. 19 shows one example of a processing flow that represents a feature of the present invention.

FIG. 19 is a flowchart for explaining the processing executed in the despooler 305 and the spool file manager 304 to realize the N-page printing function that is a feature of the present invention. The processing flow in the present invention is described below with reference to FIG. 19.

During a series of print processing, as described above, in response to a print request from the spool file manager 304, the despooler 305 reads necessary information (page description file and job setting file) from the spool file 303 and produces first-type drawing functions. Before the despooler 305 starts the print processing (i.e., the processing to produce GDI functions), the spool file manager 304 executes processing as follows.

First, the spool file manager 304 acquires the print style (step 1901) when the print request is enabled based on the notice (page break notice or notice of end of spooling) from the spooler 302. In this processing, the spool file manager 304 acquires, from the job setting file, the print style desired for the current job (a train of drawing data corresponding to a document that is requested to be printed from the application). It is herein assumed that the print style (4-page printing) of arranging data of four pages on one physical page is selected. Incidentally, the print style is represented by a setting value set by users through the property UI (User Interface) of the printer driver.

Then, in step 1902, the spool file manager 304 determines whether the acquired setting information of the print style is N-page printing. If N-page printing is set, the spool file manager 304 proceeds to step 1904, and if not so, it proceeds to step 1903. Herein, since the 4-page printing is assumed to be selected, it is determined in step 1902 that N-page printing is set.

In step 1904, the spool file manager 304 executes N-division processing to calculate respective areas on a physical sheet in which logical pages are arranged. In this step, as shown in FIG. 21A, a designated output sheet is divided into equal N areas in accordance with the N-page information acquired in step 1902. Herein, since the 4-page printing is designated, the output sheet is divided into four equal areas as shown in FIG. 21A.

In step 1905, the spool file manager 304 executes offset processing for equal N-divided areas of the output sheet obtained in above step 1904. In this offset processing, widths corresponding to respective print margins are subtracted from the sizes of four sides of each N-divided area, thereby defining an effective print region in each N-divided area with a proper offset. As a result of the offset processing, the equal N-divided areas are properly arranged on the output sheet as shown in FIG. 21B. In FIG. 21B, A to D denote values (print margins) which are acquired from the page description file and the job setting file before the start of the offset processing. Values of A' to D' representing print margins for the remaining sides of the N-divided areas are set such that the same offset value is obtained for each of the corresponding four sides of the four equal areas, i.e., A=A', B=B', C=C' and D=D'.

Then, in step 1906, the spool file manager 304 calculates a scale-down rate. In this processing, the scale-down rate is calculated so that pages acquired from the page description file are arranged in a one-to-one relation to the N-divided areas (i.e., the effective print region having evenly offset four sides in this embodiment). Assuming, for example, that page information for a logical page of G x H should be contained in one arrangement area of E x F as shown in FIG. 21C, a smaller one of E/G and F/H is selected as the scale-down rate. This selection enables the logical page to be printed in one arrangement area. At that time, the spool file manager 304 executes centering processing so that the scaled-down logical page is located at the center with respect to four sides of the arrangement area. Setting for all the arrangement areas is thus completed. Subsequently, in step 1907, the spool file manager 304 requests the despooler 305 to execute the processing to crease drawing functions. Responsively, the despooler 305 processes spool data, read out of the spool file 303, in accordance with the scale-down rate and the arrangement areas decided by the spool file manager 304, and again produces drawing functions (GDI functions) interpretable by the graphic engine 202. The thus-produced drawing functions are output from the despooler 305 to the graphic engine 202.

The graphic engine 202 converts the first-type drawing functions (GDI functions) input from the despooler 305 to second-type drawing functions (DDI functions) interpretable by the printer driver 203, and outputs them to the dispatcher 301. The dispatcher 301 transfers the second-type drawing functions (DDI functions), received from the graphic engine 202, to the printer driver 203. Upon receiving the drawing functions, as described above, the dispatcher 301 determines which module, i.e., which one of the application 201 and the despooler 305, has transferred the first-type drawing functions to the graphic engine 202. If that module is the despooler 305, the dispatcher 301 transfers the second-type drawing functions to the printer driver 203. Based on the second-type drawing functions (DDI functions) received from the dispatcher 301, the printer driver 203 produces print data described in PDL per page, and outputs the produced print data to the system spooler 204. The system spooler 204 successively delivers the print data to the printer 1500. Thus, the drawing functions are spooled once by the spooler 302, and the despooler 305 edits the spooled data and then again produces the drawing functions, which are received by the printer driver 203 via the graphic engine 202. This eliminates the need of assembling, in the printer driver 203, such functions as N-page printing, stamping, and page control (e.g., sequence change and deletion). As a result, a module of the printer driver 203 can be constituted as a universal common printer driver. Another advantage is that the above-described expansion of the system functions is absorbed by the spool file manager 304 and the despooler 305, and the term required for development is shortened. Further, the dispatcher 301, the spooler 302, the spool file manager 304, and the despooler 305 are assembled, as one virtual printer driver, in an information processing apparatus by a printer vendor, as if a printer driver provides the N-page printing function.

Through the processing described above, the N-page printing function of arranging a logical page at the center of each of equal N-divided areas of a physical sheet, is achieved with software installed in an information processing apparatus.

Second Embodiment

The above-described first embodiment is intended to provide, by a printer driver, the N-page printing function (called "physical N-page printing" hereinafter) of arranging a logical page at the center of each of equal N-divided areas of a physical sheet. This second embodiment is intended to, in the N-page printing, provide processing to selectively change over the physical N-page printing function and the N-page printing function of arranging N logical pages in equally-divided areas of the printable region on a physical sheet (called "printable region N-page printing" hereinafter).

Figure 20:
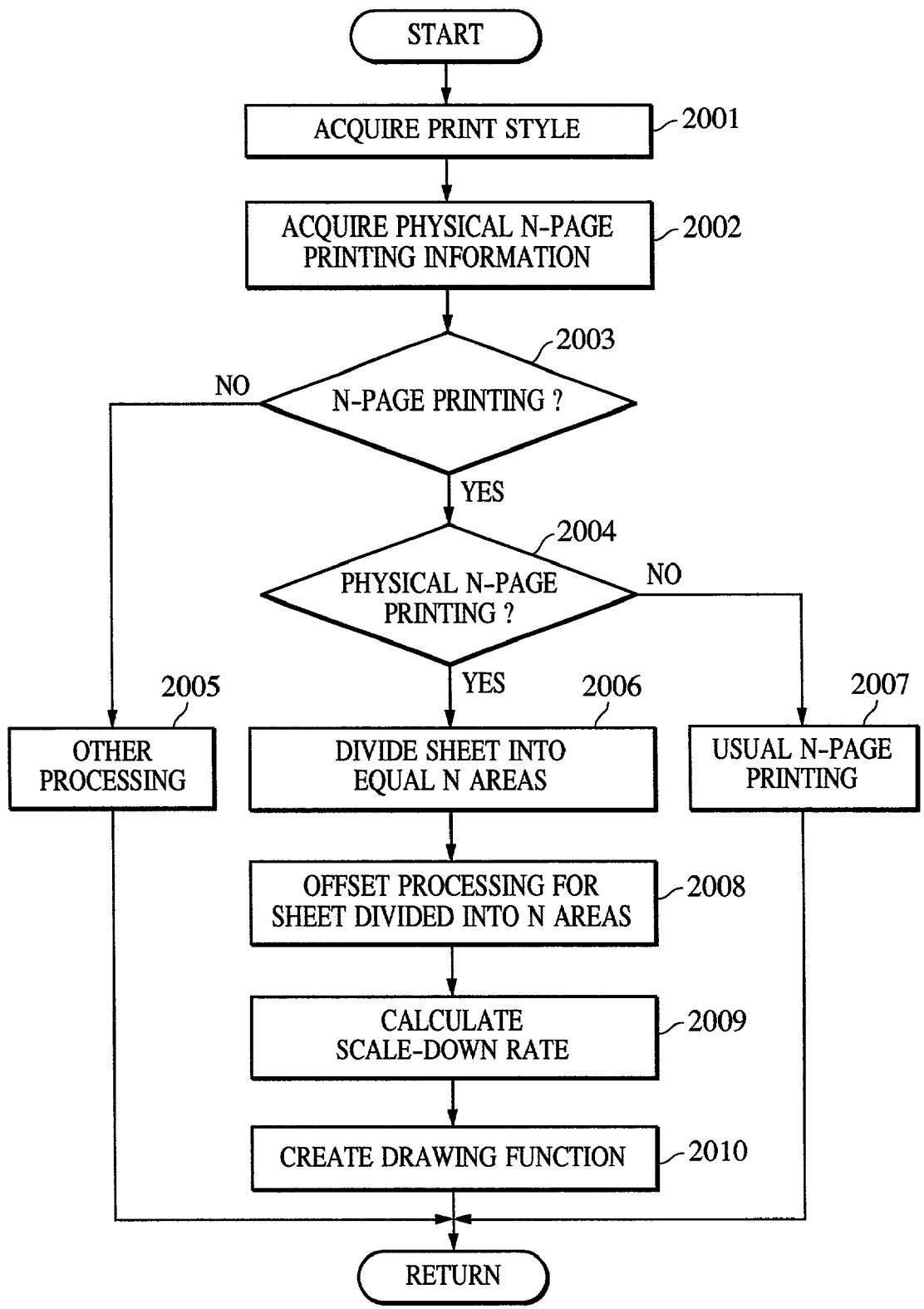
FIG. 20 shows one example of a processing flow that represents a feature the present invention.

The processing to selectively change over the physical N-page printing function and the printable region N-page printing is described below with reference to FIG. 20.

During a series of print processing, as described above, in response to a print request from the spool file manager 304, the despooler 305 reads necessary information (page description file and job setting file) from the spool file 303 and produces first-type drawing functions.

As with the first embodiment, the spool file manager 304 acquires the print style in step 2001. In this processing, the spool file manager 304 acquires, from the job setting file, the print style desired (or set) for the job under the processing.

In step 2002, the spool file manager 304 acquires physical N-page printing information (called also "physical N-page printing condition" hereinafter). The physical N-page printing condition in this embodiment means a condition indicating which type of N-page printing is to be performed as the physical N-page printing, when the information acquired in step 2001 represents the N-page printing. As shown in FIG. 22A, for example, a flag is assigned to each of 2 to 16-page printing. Then, N-page printing corresponding to any flag is executed as the physical N-page printing, and N-page printing not corresponding to any flag is executed as the printable region N-page printing. It is herein assumed that the 4-page printing is selected and a flag is set as shown in FIG. 22B. The spool file manager 304 acquires the physical N-page printing information from the printer driver 203, whereas the printer driver 203 directly acquires the physical N-page printing information from a device (i.e., the printer 1500 in this embodiment). Such device information is acquired as follows. On the property UI screen of the printer driver shown in FIG. 9, users open a "device setting" sheet and depress a "device information acquisition" button (not shown). In response to that user's instruction serving as a trigger, a device information acquiring module is booted up to acquire the device information from an external device (that corresponds to the printer 1500 in this embodiment, but may be a print server (not shown)). The device information contains the setup of options installed in the device and the physical N-page printing information.

Thereafter, in step 2003, the spool file manager 304 determines, based on information acquired in step 2001, whether the requested print job is the N-page printing. If the N-page printing is designated, the spool file manager 304 proceeds to step 2004, and if the N-page printing is not designated, it proceeds to step 2005 for normal printing. Herein, since the 4-page printing is assumed to be selected, the N-page printing is determined in step 2003.

Then, in step 2004, the spool file manager 304 determines whether the currently designated N-page printing is the physical N-page printing, described above in the first embodiment, or the printable region N-page printing. If the physical N-page printing is determined, the spool file manager 304 proceeds to step 2006, and if the physical N-page printing is not determined (the printable region N-page printing is determined), it proceeds to step 2007. That determination is realized by, based on the physical N-page printing condition acquired in step 2002, determining whether the currently designated N-page printing is the physical N-page printing or the usual printable region N-page printing. Herein, the flag, shown in FIG. 22B, is assumed to be set, which means that the physical N-page printing is executed as 4-page printing. Since the desired N-page printing is the 4-page printing, the spool file manager 304 proceeds to step 2006 and executes the physical N (four)-page printing in accordance with the same flow as described above in the first embodiment.

More specifically, in step 2006, the spool file manager 304 executes N-division processing to calculate respective areas on a physical sheet in which logical pages are arranged. In this step, as shown in FIG. 21A, a designated output sheet is divided into equal N areas in accordance with the N-page information acquired beforehand. Herein, since the 4-page printing is designated, the output sheet is divided into four equal areas as shown in FIG. 21A.

In step 2008, the spool file manager 304 executes offset processing for equal N-divided areas of the output sheet obtained in above step 2006. In this offset processing, widths corresponding to respective print margins are subtracted from the sizes of four sides of each N-divided area, thereby defining an effective print region in each N-divided area with a proper offset.

Then, in step 2009, the spool file manager 304 calculates a scale-down rate. In this processing, the scale-down rate is calculated so that pages acquired from the page description file are arranged in a one-to-one relation to the equal N-divided areas (i.e., the effective print region having evenly offset four sides in this embodiment). Setting for all the arrangement areas is thus completed. Subsequently, in step 2010, the spool file manager 304 requests the despooler 305 to execute the processing to crease drawing functions. Responsively, the despooler 305 processes spool data, read out of the spool file 303, in accordance with the scale-down rate and the arrangement areas decided by the spool file manager 304, and again produces drawing functions (GDI functions) interpretable by the graphic engine 202. The thus-produced drawing functions are output from the despooler 305 to the graphic engine 202.

Also, if it is determined in step 2004 that the currently designated N-page printing is not the physical N-page printing, the spool file manager 304 proceeds to step 2007 and makes setting to execute the printable region N-page printing (usual N-page printing). Then, the spool file manager 304 requests the despooler 305 to produce drawing functions.

Through the processing described above, a print processing module for selectively changing over the physical N-page printing function of arranging a logical page at the center of each of equal N-divided areas of a physical sheet and the printable region N-page printing function of arranging N logical pages in equal N-divided areas of the printable region on a physical sheet through scale-down arrangement is achieved with software installed in an information processing apparatus.

In the second embodiment, the physical N-page printing condition acquired in step 2002 is only applied to certain N-page printing. However, since flags are assigned to respective types of N-page printing as shown in FIG. 22A, the flags may be set as shown in FIG. 22C, for example, so that the physical N-page printing is set for 6 or 4-page printing, whereas the printable region N-page printing is set for the remaining styles of N-page printing.

Also, in the second embodiment, the determination in step 2004 is determined based on the preset physical N-page printing condition acquired in step 2002. The physical N-page printing condition is not necessarily limited to the condition indicating "which type of N-page printing should be performed as the physical N-page printing". The setting manner may be modified, by way of example, as follows. On the property UI screen for print settings of the printer driver shown in FIG. 8, an output sheet of "4-zone post card" is prepared as one additional option of the output sheet size. Then, when the output sheet of "4-zone post card" is selected, the print layout is set to 4-page printing by the physical N-page printing function. In such a modification, whether the output sheet size is set to "4-zone post card" is determined in step 2004 by employing the output sheet size as the physical N-page printing condition. Then, control is performed such that if "4-zone post card" is selected, the physical N-page printing is executed, and if another output sheet is selected, the printable region N-page printing is executed.

The present invention is applicable not only to a system constituted by plural pieces of equipment (such as a host computer, an interface unit, a reader and a printer), but also to an apparatus constituted by a single piece of equipment (such as a copying machine, a printer and a facsimile).

The objects of the present invention are achieved by supplying, to a computer (CPU and/or MPU) in a system or apparatus, a storage medium that stores program codes of software for realizing the functions of the above-described embodiments, and by causing the computer to read and execute the program codes stored in the storage medium.

In such a case, the program codes serve in themselves to realize the functions of the above-described embodiments. Hence, the storage medium storing the program code constitutes the present invention. The printing control program of the present invention contains various modules of the spooler 302, the spool file manager 304, the despooler 305, and the printer driver 302. Then, the modules realize corresponding steps (steps of the above-described flowcharts) that constitute features of the present invention.

Storage mediums for supplying the program codes may be, e.g., floppy disks, hard disks, optical disks, magneto-optical disks, CD-ROMs, CD-Rs, CD-RWs, magnetic tapes, nonvolatile memory cards, ROMs, and DVDs.

Also, the functions of the above-described embodiments are realized not only by a computer executing the program codes read out of the storage medium, but also by an OS (Operating System) or the like which is working on the computer and executes a part or the whole of the actual processing in accordance with instructions from the program codes, thereby realizing the functions of the above-described embodiments.

Further, the present invention involves such a case in which the program codes read out of the storage medium are written in a memory provided in a function add-on board mounted in the computer or a function add-on unit connected to the computer, and a CPU or the like incorporated in the function add-on board or unit executes a part or the whole of the actual processing in accordance with instructions from the program codes, thereby realizing the functions of the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

According to the present invention, as described above, the N-page printing function set on the basis of a physical sheet is provided as the function of an information processing apparatus or the function of a printing control program installed in an information processing apparatus.

Also, the N-page printing function set on the basis of a physical sheet and the N-page printing function set on the basis of equal N-divided areas of a printable region is provided in a combined manner and is selectively executed as required.

What is claimed is:

1. An information processing apparatus for having a printer driver which generates print data to be printed at a printing apparatus using drawing data output from an application, comprising:
    entry means for entering information indicating the number of division via a setting screen to divide a physical page, in executing N-page printing in which drawing data of N pages (N>1, N is an integer) is printed on the physical page which is a face of one print sheet;
    arranging means for dividing the physical page into N areas using the information indicating the number of division to divide the physical page and for arranging the drawing data of each page at each of N-divided areas of the physical page;
    first control means for controlling an arranging processing executed by said arranging means so that an internal margin between two of a plurality of drawing data arranged by said arranging means is larger than a print margin between the drawing data and an edge of the physical page;
    deciding means for deciding whether said first control means is executed based on the information indicating the number of division entered via the setting screen by said entry means; and
    generation means for generating the print data using an arranging result by said arranging means.

2. An information processing apparatus according to claim 1, further comprising condition acquiring means for acquiring a physical N-page printing condition,
    wherein said deciding means decides, based on the physical N-page printing condition acquired by said condition acquiring means, whether said first controlling means is to be executed.

3. An information processing apparatus according to claim 2, wherein said physical N-page printing condition is information indicating which one of plural types of N-page printing is set to physical N-page printing.

4. An information processing apparatus according to claim 1, wherein said determining means determines, in a case where said output sheet information indicates 4-zone post card which is premised that a printed sheet is cut into N-sheets, to employ said physical N-page printing arranging means.

5. An information processing apparatus according to claim 2, wherein said condition acquiring means acquires said physical N-page printing condition from an external device.

6. A printing control method of having a printer driver which generates print data to be printed at a printing apparatus using drawing data output from an application, comprising the steps of:
    an entry step of entering information indicating the number of division via a setting screen to divide a physical page, in executing N-page printing in which drawing data of N pages (N>1, N is an integer) is printed on the physical page which is a face of one print sheet;
    an arranging step of dividing the physical page into N areas using the information indicating the number of division to divide the physical page and of arranging the drawing data of each page at each of N-divided areas of the physical page;
    a first control step of controlling an arranging processing executed in said arranging step so that an internal margin between two of a plurality of drawing data arranged in said arranging step is larger than a print margin between the drawing data and an edge of the physical page;
    a deciding step of deciding whether said first control step is executed based on the information indicating the number of division entered via the setting screen in said entry step; and
    a generation step of generating the print data using an arranging result in arranging step.

7. A printing control method according to claim 6, further comprising a condition acquiring step of acquiring a physical N-page printing condition, wherein said deciding step decides, based on the physical N-page printing condition acquired in said condition acquiring step, whether said first controlling step is to be executed.

8. A printing control method according to claim 7, wherein said physical N-page printing condition is information indicating which one of plural types of N-page printing is set to physical N-page printing.

9. A printing control method according to claim 6, wherein said determining means determines, in a case where said output sheet information indicates 4-zone post card which is premised that a printed sheet is cut into N-sheets, to employ said physical N-page printing arranging step.

10. An information processing method according to claim 7, wherein said condition acquiring step acquires said physical N-page printing condition from an external device.

11. A printing control program stored on a computer-readable medium and executed in a printing control device for having a printer driver which generates print data to be printed at a printing apparatus using drawing data output from an application, the printing control program including the steps of:
    an entry step of entering information indicating the number of division via a setting screen to divide a physical page, in executing N-page printing in which drawing data of N pages (N>1, N is an integer) is printed on the physical page which is a face of one print sheet;

an arranging step of dividing the physical page into N areas using the information indicating the number of division to divide the physical page and of arranging the drawing data of each page at each of N-divided areas of the physical page;

a first control step of controlling an arranging processing executed in said arranging step so that an internal margin between two of a plurality of drawing data arranged in said arranging step is larger than a print margin between the drawing data and an edge of the physical page;

a deciding step of deciding whether said first control step is executed based on the information indicating the number of division entered via the setting screen in said entry step; and a generating step of generating the print data using an arranging result in said arranging step.

12. A printing control program according to claim 11, further comprising a condition acquiring step of acquiring a physical N-page printing condition, wherein said deciding step decides, based on the physical N-page printing condition acquired in said condition acquiring step, whether said first controlling step is to be executed.

13. A printing control program according to claim 12, wherein said physical N-page printing condition is information indicating which one of plural types of N-page printing is set to physical N-page printing.

14. A printing control program according to claim 12, wherein said physical N-page printing condition is information indicating that physical N-page printing is set when a predetermined output sheet size is designated.

15. An information processing program according to claim 12, wherein said condition acquiring step acquires said physical N-page printing condition from an external device.

16. A computer-readable storage medium product storing a printing control program executed in a printing control device for having a printer driver which generates print data to be printed at a printing apparatus using drawing data output from an application, the printing control program including the steps of:

an entry step of entering information indicating the number of division via a setting screen to divide a physical page, in executing N-page printing in which drawing data of N pages (N>1, N is an integer) is printed on the physical page which is a face of one print sheet;

an arranging step of dividing the physical page into N areas using the information indicating the number of division to divide the physical page and of arranging the drawing data of each page each of N-divided areas of the physical page;

a first control step of controlling an arranging processing executed in said arranging step so that an internal margin between two of a plurality of drawing data arranged in said arranging step is larter than a print margin between the drawing data and an edge of the physical page;

a deciding step of deciding whether said first control step is executed based on the information indicating the number of division entered via the setting screen by said entry means; and a generating step of generating the print data using an arranging result in said arranging step.

17. An information processing apparatus according to claim 1, wherein said determining means determines which one of said physical N-page printing arranging means and said printable region N-page printing arranging means is employed to execute processing for arranging the pages on the basis of one of the information indicating the number of division, an output sheet size and an output sheet entered by said entry means.

18. A printing control method according to claim 6, wherein said determining step determines which one of said physical N-page printing arranging step and said printable region N-page printing arranging step is employed to execute processing for arranging the pages on the basis of one of the information indicating the number of division, an output sheet size and an output sheet entered in said entry step.

19. A printing control program according to claim 16, wherein said determining step determines which one of said physical N-page printing arranging step and said printable region N-page printing arranging step is employed to execute processing for arranging the pages on the basis of one of the information indicating the number of division, an output sheet size and an output sheet entered in said entry step.

20. An information processing apparatus according to claim 1, further comprising second controlling means for controlling the arranging processing of the drawing data by said arranging means so that the internal margin between two of the plurality of drawing data arranged by said arranging means is not left, wherein said deciding means decides to execute said second controlling means when said deciding means decides that said first controlling means is not to be executed.

21. A printing control method according to claim 6, further comprising a second controlling step of controlling the arranging processing of the drawing data in said arranging step so that the internal margin between two of the plurality of drawing data arranged in said arranging step is not left, wherein it is decided in said deciding step to execute said second controlling step when it is decided in said deciding step that said first controlling step is not to be executed.

22. A program according to claim 11, further comprising a second controlling step of controlling the arranging processing of the drawing data in said arranging step so that the internal margin between two of the plurality of drawing data arranged in said arranging step is not left, wherein it is decided in said deciding step to execute said second controlling step when it is decided in said deciding step that said first controlling step is not to be executed.

* * * * *

UNITED STATES PATENT AND TRADEMARK OFFICE
CERTIFICATE OF CORRECTION

| | | |
|---|---|---|
| PATENT NO. | : 7,304,764 B2 | |
| APPLICATION NO. | : 09/994723 | |
| DATED | : December 4, 2007 | |
| INVENTOR(S) | : Nishikawa et al. | |

It is certified that error appears in the above-identified patent and that said Letters Patent is hereby corrected as shown below:

COLUMN 3:
      Line 46, "feature" should read -- feature of --.

COLUMN 4:
      Line 62, "connected" should read -- connected to --.

COLUMN 6:
      Line 41, "hold" should read -- holds --.

COLUMN 10:
      Line 24, "before" should read -- before being --.

COLUMN 11:
      Line 28, "2OMS<" should read -- 20MS, --.

COLUMN 14:
      Line 47, "logical-pages" should read -- logical pages --.

COLUMN 16:
      Line 17, "waits" should read -- wait --.

COLUMN 26:
      Line 40, "in" should read -- in said --.

COLUMN 27:
      Line 57, "larter" should read -- larger --.

UNITED STATES PATENT AND TRADEMARK OFFICE
CERTIFICATE OF CORRECTION

PATENT NO. : 7,304,764 B2
APPLICATION NO. : 09/994723
DATED : December 4, 2007
INVENTOR(S) : Nishikawa et al.

It is certified that error appears in the above-identified patent and that said Letters Patent is hereby corrected as shown below:

COLUMN 28:
Line 23, "claim 16," should read -- claim 11, --.

Signed and Sealed this

Twenty-ninth Day of July, 2008

JON W. DUDAS
*Director of the United States Patent and Trademark Office*